(12) United States Patent
Rieger et al.

(10) Patent No.: US 12,141,926 B2
(45) Date of Patent: Nov. 12, 2024

(54) COMPUTER-IMPLEMENTED HUMAN-MACHINE INTERACTION METHOD AND USER INTERFACE

(71) Applicant: Galactify GMBH, Munich (DE)

(72) Inventors: Maximilian Rieger, Munich (DE); Gregor Hohmann, Munich (DE)

(73) Assignee: GALACTIFY GMBH, Munich (DE)

( * ) Notice: Subject to any disclaimer, the term of this patent is extended or adjusted under 35 U.S.C. 154(b) by 180 days.

(21) Appl. No.: 18/002,098

(22) PCT Filed: Jul. 22, 2021

(86) PCT No.: PCT/EP2021/070614
§ 371 (c)(1),
(2) Date: Dec. 16, 2022

(87) PCT Pub. No.: WO2022/018233
PCT Pub. Date: Jan. 27, 2022

(65) Prior Publication Data
US 2023/0237743 A1 Jul. 27, 2023

(30) Foreign Application Priority Data
Jul. 23, 2020 (EP) .................. 20187414

(51) Int. Cl.
*G06T 19/00* (2011.01)
(52) U.S. Cl.
CPC ...... *G06T 19/003* (2013.01); *G06T 2219/024* (2013.01)
(58) Field of Classification Search
CPC ............ G06T 19/003; G06T 2219/024
See application file for complete search history.

(56) References Cited

U.S. PATENT DOCUMENTS 6,081,271 A * 6/2000 Bardon .................. G06T 15/10
345/419

OTHER PUBLICATIONS

Dudáš, Marek, et al. "Ontology visualization methods and tools: a survey of the state of the art." The Knowledge Engineering Review 33 (2018): e10. (Year: 2018).*

(Continued)

*Primary Examiner* — Xin Sheng
(74) *Attorney, Agent, or Firm* — Maginot, Moore & Beck LLP

(57) ABSTRACT

A human-machine interaction, HMI, user interface (1) connected to at least one controller or actuator of a complex system (SYS) having a plurality of system components, C, represented by associated blocks, B, of a hierarchical system model (SYS-MOD) stored in a database, DB, (5) said user interface (1) comprising: an input unit (2) adapted to receive user input commands and a display unit (3) having a screen adapted to display a scene within a three-dimensional workspace, $WS_{B1}$, associated with a selectable block, B1, representing a corresponding system component, C, of said complex system (SYS) by means of a virtual camera, $VC_{B1}$, associated to the respective block, B1, and positioned in a three-dimensional coordinate system within a loaded three-dimensional workspace, $WS_{B1}$, of said block, B1, wherein the virtual camera, $VC_{B1}$, is moveable automatically in the three-dimensional workspace, $WS_{B1}$, of the associated block, B1, in response to a user input command input to the input unit (2) of said user interface (1) to perform a zooming operation on the respective block, B1, to reveal or hide its content areas, CAs, wherein the content areas, CAs, of the zoomed block, B1, include nested child blocks, B1_1, B1_2, of the respective block, B1.

16 Claims, 12 Drawing Sheets

(56) References Cited

OTHER PUBLICATIONS

Frisch, Mathias, and Raimund Dachselt. "Towards a framework for supporting software modeling activities through novel interaction and visualization techniques." 2009 31st International Conference on Software Engineering-Companion Volume. IEEE, 2009. (Year: 2009).*

Summers et al., "An Experimental Evaluation of Continuous Semantic Zooming in Program," Information Visualization, 2003, INFOVIS, IEEE Symposium, Jan. 1, 2003 (Jan. 1, 2003), pp. 155-162, XP031173446, DOI:10.1109/INFVIS.2003.1249021, ISBN: 978-0-7803-8154-4.

Frisch et al., "Towards a Framework for Supporting Software Modeling Activities through Novel Interaction and Visualization Techniques," Software Engineering-Companion Volume, ICSE-Companion, 31st International Conference on IEEE, May 16, 2009 (May 16, 2009), pp. 359-362, XP031472642, ISBN: 978-1-4244-3495-4.

Dudáš et al., "Ontology visualization methods and tools: a survey of the state of the art," The Knowledge Engineering Review, vol. 33, ISSN: 0269-8889, DOI: 10.1017/S0269888918000073.

\* cited by examiner

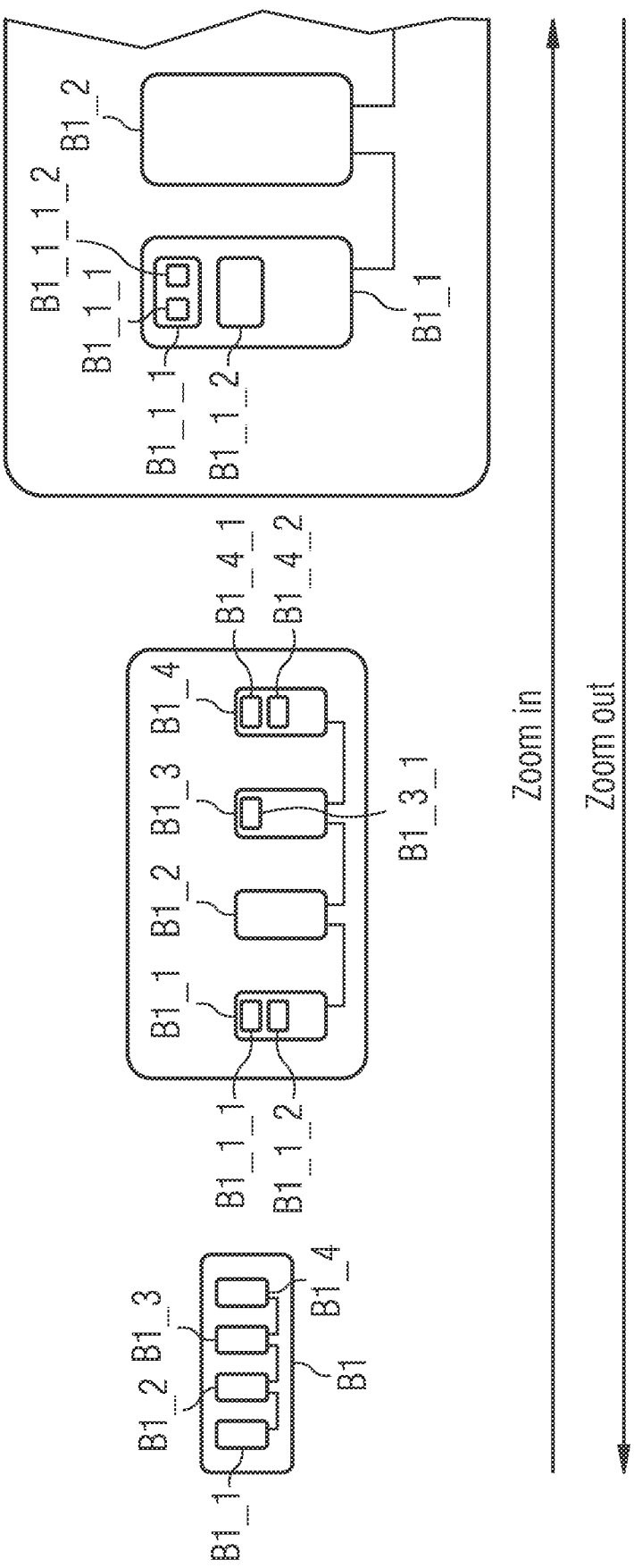

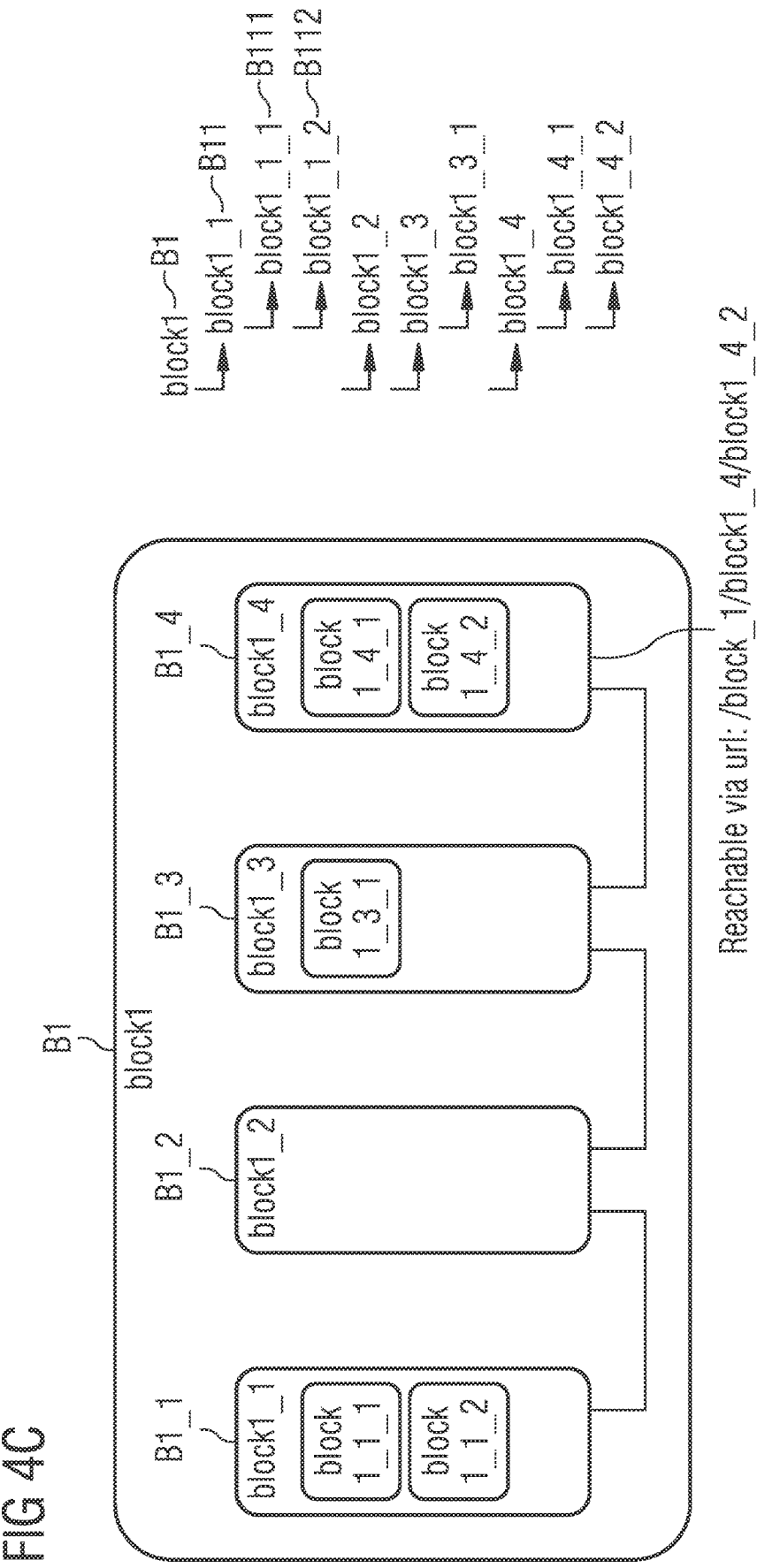

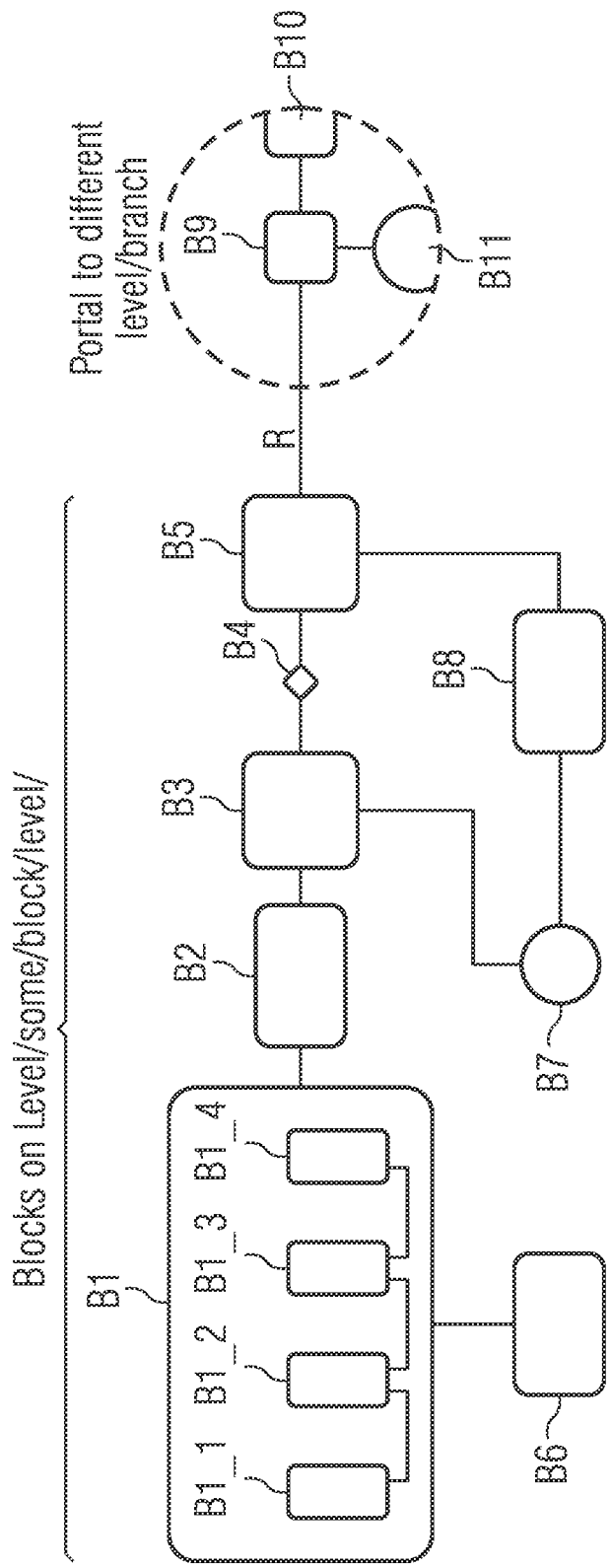

```
{
  // identity properties
  id: 1,
  userId: ...,
  name: 'Block-1',
  version: 23, // geometrical properties
  size: {width: 100, height: 100},
  pos: {x: 0, y: 0, z: 0 },
  shape: 'circle', // style properties
  style: {
     border-color: 'black',
  }

// more properties
  ...
```

```
{
  id: 2,
  name: 'Hello-Universe',
  shape: 'rectangle',
  ...

content: {
    [...],
    textContent: {
      [...],
      version: 10,
      text: 'Hello Universe'
    }
  }, style: {
  ...
  border-radius: 20
  }
```

```
{
  id: 3
  name: 'My picture',
  shape: 'rectangle',
  ...

content: {
    [...],
    textContent: {
      [...],
      text: 'My picture'
    },
    ...;
    imgContent {
      [...],
      src:' ./picture.png'
    },
    ...
}
```

COMPUTER-IMPLEMENTED HUMAN-MACHINE INTERACTION METHOD AND USER INTERFACE

The invention relates to a computer-implemented human-machine interaction method and a user interface used to assist a user to retrieve information about a complex system and to plan, monitor and control components of the respective complex system.

A technical system such as manufacturing facilities or vehicles become increasingly complex. A system can comprise a plurality of interrelated hardware or software components. Each component of a system can itself comprise other components at a lower hierarchical level. With increasing complexity of the system, the number of hierarchical levels does also increase. For planning of a technical system, in particular a technical system such as a facility, a system can be represented by a hierarchical system model where each subsystem and component can be represented by a corresponding data object of the model. A hierarchical system model of the respective system can be used for planning and operating the system. The operation of a technical system includes controlling system components during operation of the system. Further, system components may require maintenance or repair during the operation lifetime of the complex technical system. Most technical facilities comprise a human-machine interface HMI allowing a user to interact with the system and performing a technical task such as controlling a function of the technical system during its operation or triggering repair or maintenance procedures in case of an observed critical situation. A conventional human-machine interaction user interface comprises an input unit to receive user input commands and a display unit having a screen to display information to the user such as a fault detected during operation of the monitored technical system. However, the screen of a display unit of the user interface is limited in its size. In particular, the screen of a portable control device such as a laptop or a tablet only comprises a limited screen area to output information data to the user. The information in the limited area of the screen does only allow to display simultaneously only a limited number of hierarchy levels within a hierarchical system model of the technical system or facility. The hierarchical system model can in most cases be represented by a diagram or graph having interrelated nodes wherein each node of the graph represents a subsystem or component of the corresponding complex system. Because of the complexity of the system and the number of hierarchy levels, complex diagrams do not provide a transparent overview with respect to a complex situation such as a faulty operation of the system affecting at the same time a plurality of hierarchy levels of the technical system.

Several languages like the technical-oriented UML or SYSML or BPMN have been established as a de facto standard for developing and describing the inner characteristics component of a complex system and their interactions with other components outside the technical system via boundaries such as interfaces of the system. There are different tools which allow to visualize a system, in particular diagramming tools which allow to create process diagrams, timeline diagrams, hierarchical diagrams such as organigrams or ontologies as well as basic technical models such as CAD models of components of the system.

A further group of tools can be used to create and display circuit diagrams, data structures or workflows. This group of modeling software tools can also be called expert tools. These tools help domain experts to create complex data structures including management supply cycles and variants of the respective technical system.

On the one hand, many common modeling software tools focus on the representation of data models for a specific domain or specific technical task. However, problems may occur when models of domains are exchanged between these domains. When creating new technical or processual solutions, exchanges between different models are fairly common. On the other hand, using diagramming tools which are easy to learn and can be used in different domains cannot cope with the complexity of the development of software and hardware products. This does lead to the not satisfactory situation that highly skilled experts do collaborate with each other using screenshots or working with different incompatible sources and data models. Figuratively speaking, today's technology and systems are often developed using outdated techniques.

Conventional software tools do not support the connection of different data models visually which may prevent users from understanding correlations because of an insufficient overview over the complete technical system which may lead to errors affecting the operation of the observed and controlled technical system negatively.

Conventional software tools in particular have only limited zooming and nesting capabilities. When zooming through several hierarchical levels, the displayed subsystems and components become increasingly small on the screen of the display unit because of the limited size of the screen and the limited resolution of the screen. At a low hierarchical level, different components or objects represented in the model become undistinguishable, so that in particular control areas of a displayed data object representing for instance a control component such as a controller within the technical system can no longer be observed and operated by the user via such a conventional human-machine interface. When zooming with a conventional software tool on an object of interest at a low hierarchical level information concerning the object of interest becomes eventually undistinguishable so that the user cannot react to a critical situation such as a hazardous event in the observed technical facility. Additionally, most software tools restrict visual nesting to only one or two hierarchical levels. Deeper hierarchical levels can only be accessed indirectly via different tabs, documents or models. This subsequently leads to a poor understanding of the overall system. A further disadvantage of conventional human-machine interfaces resides in that it is not possible to jump directly to data objects of interests at lower hierarchical levels.

Accordingly, it is an object of the present invention to provide a method and apparatus which allows for more efficient human-machine interaction to increase the reliability in controlling a complex technical system, in particular to facilitate a zooming onto objects of interest within a stored data model representing components of the complex technical system.

This object is achieved according to a first aspect of the present invention by a computer-implemented human-machine interaction method comprising the features of claim 1.

The invention provides according to a first aspect a computer-implemented human-machine interaction method used to assist a user to retrieve and generate information about a complex system, SYS, represented by a hierarchical system model, SYS-MOD, stored in a database, DB, and displayed as a corresponding nested structure on a display unit of a user interface, wherein said hierarchical system model is processed to plan, monitor and/or to control said complex system, SYS, wherein the computer-implemented human-machine interaction method performs the following steps iteratively:

loading in a first step, S1, a three-dimensional workspace, $WS_{B1}$, associated with a block, B1, using an associated unique URL representing a component of said complex system, SYS, wherein the loaded three-dimensional workspace, $WS_{B1}$, of said block, B1, contains a scene of child blocks of said block, B1, defined as subordinates of said block, B1, in the hierarchical system model, SYS-MOD, stored in the database, DB, and positioned in the loaded three-dimensional workspace, $WS_{B1}$, of said block, B1, displaying in a second step, S2, the three-dimensional workspace, $WS_{B1}$, by projecting the scene of child blocks, B1_x, of said block, B1, onto a screen of said display unit by means of a virtual camera, $VC_{B1}$, which is associated to the block, B1, and is positioned in a three-dimensional Cartesian coordinate system within the three-dimensional workspace, $WS_{B1}$, of said block, B1, revealing or hiding in a third step, S3, content areas, CAs, of visible displayed child blocks of said block, B1, depending on a reveal and/or hide criterion, calculated based on among others the size of the respective child block, the screen size of the screen and a distance, d, of the virtual camera, $VC_{B1}$, associated to said block, B1, to the respective child blocks of said block, B1, and displaying in a fourth step, S4, deeper nested child blocks corresponding to lower hierarchical levels of the hierarchical system model, SYS-MOD, stored in the database, DB, if a content area, CA, of type children-area of a child block, B1_1, is revealed by projecting the scene of child blocks of the respective child blocks, B1_1, of the block, B1, onto the screen of the display unit via an intermediate, virtual projection of the scene of child blocks of child block, B1_1, onto said child block, B1_1, and repeating the third step, S3, as well as the fourth step, S4, until all child blocks and associated content areas, CAs, are displayed according to the reveal and/or hide criterion used in the third and fourth step.

The computer-implemented human-machine interaction method according to the first aspect of the present invention allows to zoom in or to zoom out across an infinite number of hierarchical levels of a hierarchical system model, SYS-MOD, of a complex system, SYS. This increases efficiency when planning a complex system and provides reliable monitoring and control of the associated complex system.

The monitoring and controlling of the complex system, SYS, can be performed via its graphical displayed system model providing the additional benefit that subsystems which are the cause for a current operation state of a system component, C, can immediately be zoomed, e.g. to find efficiently a root cause for a critical operation state of a system component, C, without losing the overview on the whole system.

A further benefit is that during control and monitoring of system components, C, using the associated blocks, B, also the relations, R, between different blocks, B, are visible at the same time showing the technical context of any affected system component, C, within the whole complex system, SYS. This facilitates monitoring of momentary operation states of technical components, C, and makes a control of a technical component, C, when performing user command triggered operations on the associated block, B, less error-prone thus increasing the safety and performance of the controlled technical system, SYS.

In a possible embodiment of the computer-implemented human-machine interaction method according to the first aspect of the present invention, the virtual camera, $VC_{B1}$, is positioned and moved in the three-dimensional workspace, $WS_{B1}$, of the associated block, B1, in response to a user command input into an input unit of the user interface or in response to a command received via a control interface from a controller, in particular from a controller of the corresponding complex technical system.

In a further possible embodiment of the computer-implemented human-machine interaction method according to the first aspect of the present invention, if a predefined switchover criterion is fulfilled switching from a current three-dimensional workspace, $WS_{B1}$, and the virtual camera, $VC_{B1}$, associated with the block, B1, to another three-dimensional workspace, $WS_{B1\_1}$, and to the virtual camera, $VC_{B1\_1}$, associated with a child block, B1_1, of said block, B1, is performed automatically or manually as well as seamlessly, accompanied by an automatic change of the URL from the URL associated with said block, B1, to the URL associated with the child block, B1_1.

In a further possible embodiment of the computer-implemented human-machine interaction method according to the first aspect of the present invention, wherein if a predefined switchover criterion is fulfilled a switching from a current three-dimensional workspace, $WS_{B1\_1}$, and the virtual camera, $VC_{B1\_1}$, associated with the child block, B1_1, to another three-dimensional workspace, $WS_{B1}$, and to the virtual camera, $VC_{B1}$, associated with the parent block, B1, of the block, B1_1, is performed automatically or manually as well as seamlessly, accompanied by an automatic change of URL from the URL associated with the child block, B1_1, to the URL associated with the parent block, B1.

In a further possible embodiment of the computer-implemented human-machine interaction method according to the first aspect of the present invention, wherein a block, B1, at a hierarchical level, HL, of the hierarchical system model stored in the database, DB, which is connected with a parent-child relation to another block, B1_1, at a lower hierarchical level, HL, of said hierarchical system model forms a parent block with respect to the other block, B1_1, at the lower hierarchical system level, HL, which in turn forms a child block of said parent block, B1, at the higher hierarchical level, HL.

In a further possible embodiment of the computer-implemented human-machine interaction method according to the first aspect of the present invention, each block is containing a number of content areas, CAs, of different content area types, wherein said content areas, CAs, are arranged in rows and columns and said content areas are revealable or hideable according to the reveal and/or hide criterion.

In a further possible embodiment of the computer-implemented human-machine interaction method according to the first aspect of the present invention, the reveal/hide criterion for content areas, CAs, is based on further predefined factors such as an optimal amount of information to be displayed on the screen of the display unit of the user interface.

In a further possible embodiment of the computer-implemented human-machine interaction method according to the first aspect of the present invention, the content area types, CATs, of content areas, CAs, of a block, B, of said hierarchical system model stored in the database, DB, comprise a first content area type, CAT1, adapted to indicate deeper nested child blocks of the respective block (child-area), a second content area type, CAT2, containing content data, in particular content such as text content data and image content data (data-area), a third content area type, CAT3, containing dynamic data provided by third party services via API (dynamic-area) and a fourth content area type, CAT4, providing a user's input sensitive content area adapted to generate automatically a control signal if the user input sensitive area is selected in response to a user selection command (user control input-area).

In a further possible embodiment of the computer-implemented human-machine interaction method according to the first aspect of the present invention, important and critical information of deeper hierarchical levels can be visually passed to blocks of higher hierarchical levels.

In a further possible embodiment of the computer-implemented human-machine interaction method according to the first aspect of the present invention, each block, B, of the hierarchical system model stored in the database, DB, can comprise a unique block identifier or name and associated uniform resource locator, URL, reflecting the hierarchical structure of the hierarchical system model stored in the database, DB.

In a further possible embodiment of the computer-implemented human-machine interaction method according to the first aspect of the present invention, each block, B, comprises a user-defined rights-management with which a user can give other users read or write access, R/W, to the workspace, $WS_B$, associated with a block, B, via an URL, associated with the respective block, B.

In a further possible embodiment of the computer-implemented human-machine interaction method according to the first aspect of the present invention, the user-defined rights-management setting is passed down automatically to direct child-blocks and deeper nested child-blocks of a block, B, as long as no other user-defined rights-management setting is applied to a child-block or deeper child-block of said block, B.

In a further possible embodiment of the computer-implemented human-machine interaction method according to the first aspect of the present invention, the virtual camera, $VC_{B1}$, associated with the block, B1, of the hierarchical system model stored in the database, DB, is moved in response to a zoom user command input into an input unit of the user interface within the three-dimensional workspace, $WS_{B1}$, towards the child-block, B1_1, of said block, B1, to reduce a distance, d, between the virtual camera, $VC_{B1}$, and the child-block, B1_1, within the three-dimensional workspace, $WS_{B1}$, and to zoom in on the respective child-block, B1_1, and its content areas, CAs.

In a further possible embodiment of the computer-implemented human-machine interaction method according to the first aspect of the present invention, the virtual camera, $VC_{B1}$, associated with the block, B1, of the hierarchical system model stored in the database, DB, is moved in response to a pan user command input into an input unit of the user interface in the three-dimensional workspace, $WS_{B1}$, parallel to the child-blocks, of said block, B1.

In a further possible embodiment of the computer-implemented human-machine interaction method according to the first aspect of the present invention, the virtual camera, $VC_{B1}$, associated with a block, B1, of the hierarchical system model stored in the database, DB, is rotated automatically in response to a rotate user command input into an input unit of the user interface in the three-dimensional workspace, $WS_{B1}$, around the current camera position of the associated virtual camera, $VC_{B1}$.

In a further possible embodiment of the computer-implemented human-machine interaction method according to the first aspect of the present invention, blocks within the hierarchical system model, SYS-MOD, stored in the database, DB, are linkable to each other via relations, R, which comprise associated relation labels to describe the respective relation, R.

In a further possible embodiment of the computer-implemented human-machine interaction method according to the first aspect of the present invention, blocks, B, within the hierarchical system model, SYS-MOD, stored in the database, DB, are linkable to blocks on different parts, i.e. not hierarchy levels, HLs, of the hierarchical system model, SYS-MOD, stored in the database, DB.

In a further possible embodiment of the computer-implemented human-machine interaction method according to the first aspect of the present invention, the switchover criterion is based on a configurable distance threshold, TH, in the three-dimensional workspace, WS, wherein if a calculated distance, d, between the virtual camera, $VC_{B1}$, movable within the three-dimensional workspace, $WS_{B1}$, associated with the block, B1, and a child-block, B1_1, of block B1, becomes smaller than the configurable distance threshold, TH, a switchover to the virtual camera, $VC_{B1\_1}$, associated with the child block B1_1 of said block, B1, is performed automatically.

In a further possible embodiment of the computer-implemented human-machine interaction method according to the first aspect of the present invention, the distance threshold, TH, is based on further criteria comprising among others the direction along which the virtual camera, VC, is moved towards the respective child-block, the size of the respective child-block and the screen size of the screen of the display unit of the user interface.

In a further possible embodiment of the computer-implemented human-machine interaction method according to the first aspect of the present invention, new child-blocks, B1_x, of a block, B1, are creatable by a user within the workspace, $WS_{B1}$, associated with a block, B1, if the user has a write access to the block, B1.

In a further possible embodiment of the computer-implemented human-machine interaction method according to the first aspect of the present invention, a style of a child-block of a block, B1, comprising among others background-color, border-color and border-radius, is editable by the user within the workspace, $WS_{B1}$, associated with the block, B1, if the user has write access to the respective block, B1.

In a further possible embodiment of the computer-implemented human-machine interaction method according to the first aspect of the present invention, the size of a child-block of a block, B1, is changeable by the user U within the workspace, $WS_{B1}$, associated with the block, B1, if the user U has write access to the respective block, B1.

In a further possible embodiment of the computer-implemented human-machine interaction method according to the first aspect of the present invention, the position of a child-block of a block, B1, is changeable via dragging or entering the position directly by the user U within the workspace, $WS_{B1}$, associated with the block, B1, if the user U has write access to the respective block, B1.

In a further possible embodiment of the computer-implemented human-machine interaction method according to the first aspect of the present invention, the hierarchical position of a child-block of a block, B1, is changeable via a drag and drop operation by the user U within the workspace, $WS_{B1}$, associated with the block, B1, if the user U has write access to the respective block, B1, and the new parent-block to which the child-block is moved to.

In a further possible embodiment of the computer-implemented human-machine interaction method according to the first aspect of the present invention, new content-areas, CAs, for a child-block of a block, B1, are creatable by the user U within the workspace, $WS_{B1}$, associated with the block, B1, if the user U has write access to the respective block, B1.

In a further possible embodiment of the computer-implemented human-machine interaction method according to the first aspect of the present invention, the content of content-areas, CAs, of the second content area type, CAT2, of a child-block of a block, B1, are editable by the user U in response to a user selection command on the respective content-area, CA, within the workspace, $WS_{B1}$, associated with the block, B1, if the user has write access to the respective block, B1.

In a further possible embodiment of the computer-implemented human-machine interaction method according to the first aspect of the present invention, the content of content-areas, CAs, of the third content area type, CAT3, of a child-block of a block, B1, is updated automatically if the associated API provides changed data. Vice versa, if the user U has write access to the respective block, B1 and changes the data of the respective content area, CA, an update event is sent to the associated API.

In a further possible embodiment of the computer-implemented human-machine interaction method according to the first aspect of the present invention, wherein the editing actions of a user for working via the user interface in a workspace, $WS_{B1}$, of a block, B1, are mirrored automatically to other users viewing the same workspace, $WS_{B1}$, within a short time period of fractions of seconds such that a collaborative editing of the workspace, $WS_{B1}$, by different users is supported.

In a further possible embodiment of the computer-implemented human-machine interaction method according to the first aspect of the present invention, the hierarchical system model, SYS-MOD, stored in the database, DB, is displayed as a corresponding nested structure on a screen of a display unit of the user interface based on a unified modeling language, UML, or a systems modeling language, SysML, and can be imported and exported as UML or SysML data structures wherein structures in UML or SysML are displayed in a three-dimensional workspace and hierarchical relations as nested structures.

In a further possible embodiment of the computer-implemented human-machine interaction method according to the first aspect of the present invention, different pillars of the system modeling language SysML including structure, behavior, requirements and parametrics are combinable in one single workspace, WS.

In a further possible embodiment of the computer-implemented human-machine interaction method according to the first aspect of the present invention, calculations to display three-dimensional workspaces, $WS_B$, associated with blocks, B, are performed on a graphics processing unit, GPU, which is optimized for calculations of three-dimensional.

In a further possible embodiment of the computer-implemented human-machine interaction method according to the first aspect of the present invention, wherein if a content-area, CA, of the fourth content area type, CAT4, of a block, B, is selected in response to a user selection command input via an input unit of the user interface, the generation of at least one control signal, CRTL, is triggered automatically, wherein the at least one generated control signal is supplied to a controller or to an actuator forming components of the complex technical system, SYS, represented by the hierarchical system model stored, SYS-MOD, in the database, DB.

In a further possible embodiment of the computer-implemented human-machine interaction method according to the first aspect of the present invention, each block, B, in the hierarchical system model, SYS-MOD, stored in the database, DB, represents a hardware component or a software component of said complex technical system and wherein each child block, $B1\_x$, of said block, B1, represents a subcomponent represented by said block, B1, forming a parent block of the respective child block, $B1\_x$.

The computer-implemented human-machine interaction method according to the first aspect of the present invention can be performed by a software tool executed on at least one processor of a processing unit of a user interface integrated in a user equipment or in a user terminal.

The invention further provides according to a further aspect a human-machine interaction user interface comprising the features of claim 14.

The invention provides according to the second aspect a human-machine interaction user interface connected to a control unit or actuator of a complex system having system components, C, each represented by a block of a hierarchical system model stored in a database, DB, said user interface comprising:

an input unit adapted to receive user input commands and a display unit having a screen adapted to display a scene within a three-dimensional workspace, $WS_{B1}$, associated with a block, B1, representing a component of said complex system by means of a virtual camera, $VC_{B1}$, which is associated to the respective block, B1, and is positioned in a three-dimensional Cartesian coordinate system within the three-dimensional workspace, $WS_{B1}$, of said block, B1, wherein the virtual camera, $VC_{B1}$, is moveable in the three-dimensional workspace, $WS_{B1}$, of the associated block, B1, in response to a user input command input into the input unit of said user interface to zoom on the respective block, B1, and its content areas, CAs.

In a possible embodiment of the human-machine interaction user interface according to the second aspect of the present invention, the block, B1, comprises a user input sensitive content area, CA, of the fourth content area type, CAT4, which is adapted to generate automatically a control signal, CRTL, in response to a user activation command applied to the user input sensitive content area to trigger the generation of the control signal supplied to a system component, C, of said complex technical system represented by said block, B1, or to another system component, C, of said complex technical system represented by another block, B', having a relation to said block, B1, in the hierarchical system model stored in the database, DB.

In a possible embodiment of the human-machine interaction user interface, a processing unit of the user interface, in particular a graphical processing unit (GPU), is used to perform iteratively a program executed to perform the following steps:

Loading, S1, a three-dimensional workspace, $WS_{B1}$, associated with a block, B1, representing a system component, C, of said complex technical system, SYS, in a data memory, wherein the loaded three-dimensional workspace, $WS_{B1}$, contains a scene of child blocks of said block, B1, being defined as subordinates of said block, B1, in the hierarchical system model stored in the database, DB, and positioned in the loaded three-dimensional workspace, $WS_{B1}$, of said block, B1;

displaying, S2, the loaded three-dimensional workspace, $WS_{B1}$, by projecting the scene of child blocks, B1_x, of the block, B1, onto a screen of the display unit of said human-machine interaction user interface by means of a virtual camera, $VC_{B1}$, associated to said block, B1, which is positioned in the loaded three-dimensional workspace, $WS_{B1}$, of said block, B1;

revealing or hiding, S3, content areas, CAs, of the visible child blocks, B1_x, of the block, B1, depending on a momentary calculated distance, d, between the virtual camera, $VC_{B1}$, associated with the block, B1, and the currently displayed child blocks, B1_x, of the respective block, B1; and displaying, S4, deeper nested child blocks corresponding to lower hierarchical levels of the hierarchical system model stored in the database, DB, if a content area, CA, of a children content area type, CAT1, of a child block, B1_1, is revealed, by projecting the scene of child blocks of the child block, B1_1, of the block, B1, onto the screen of the display unit via an intermediate, virtual projection of the scene of child blocks of child block, B1_1, onto said child block, B1_1.

In the following, different aspects of the present invention are described in more detail with reference to the enclosed figures.

FIGS. 4A, 4B, 4C, 4D show an example of a parent block B1 having several child blocks;

Figure 6:
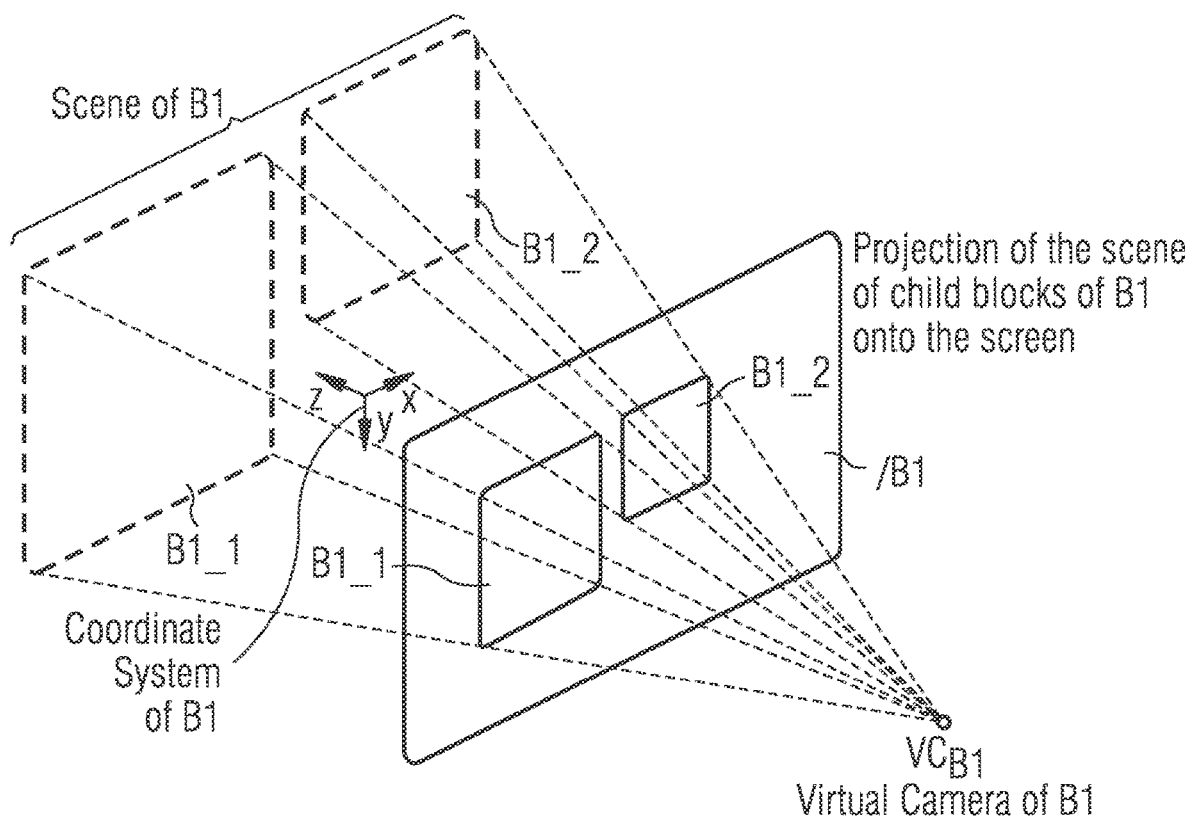
Figure 7:
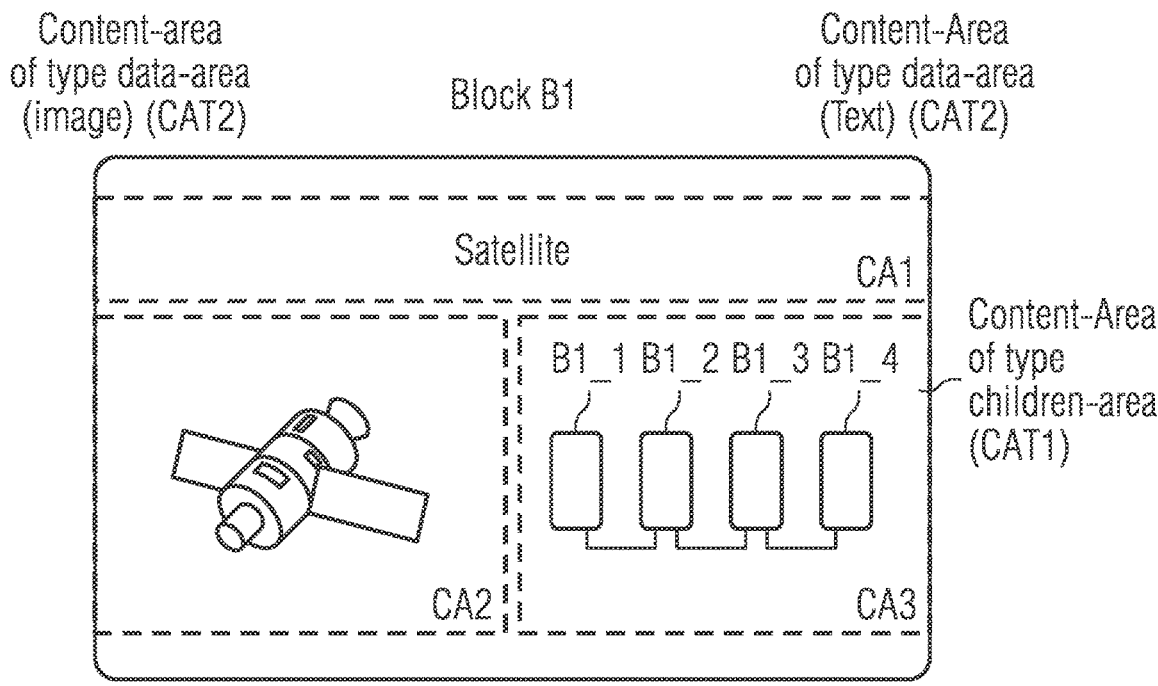
Figure 8:
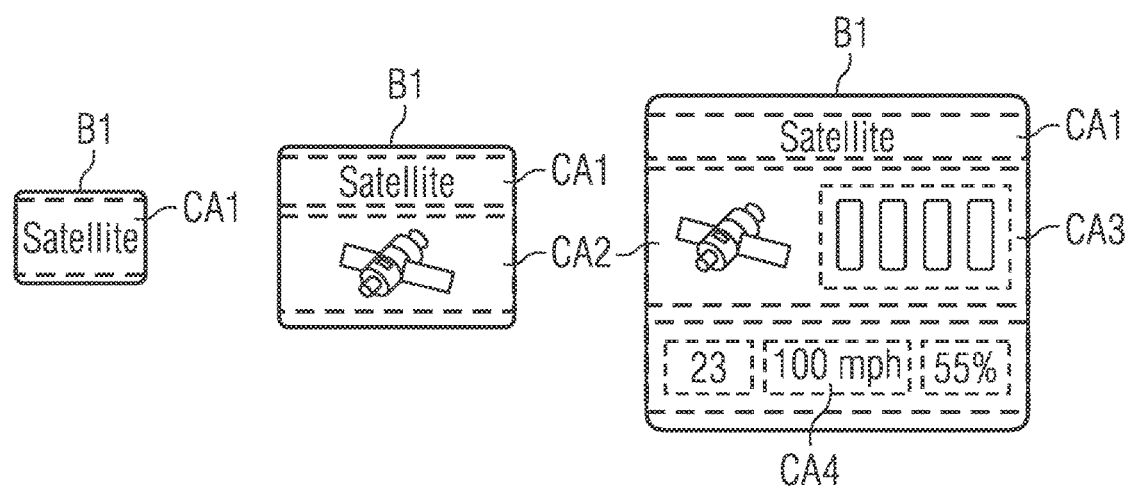
Figure 9:
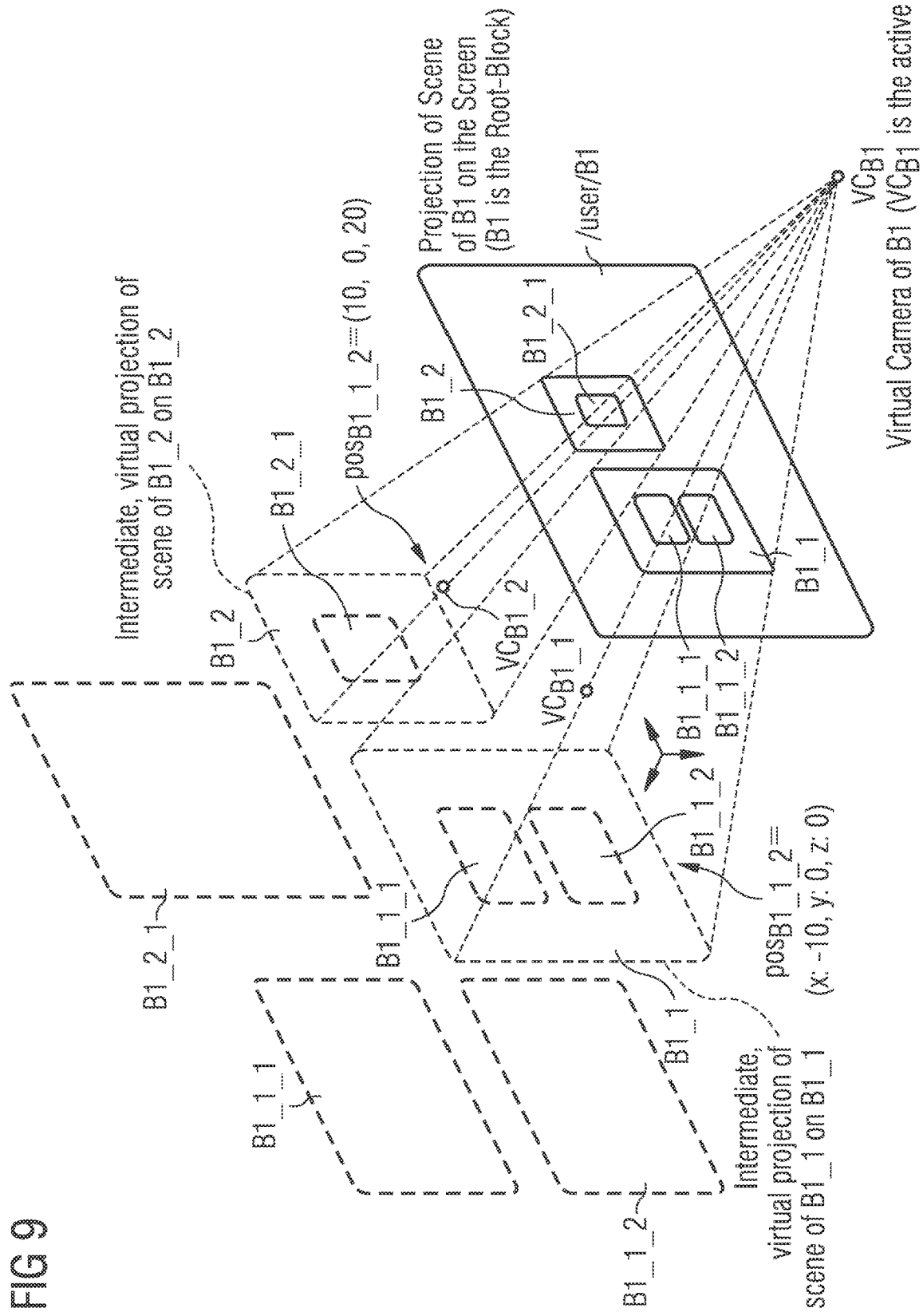
Figure 10:
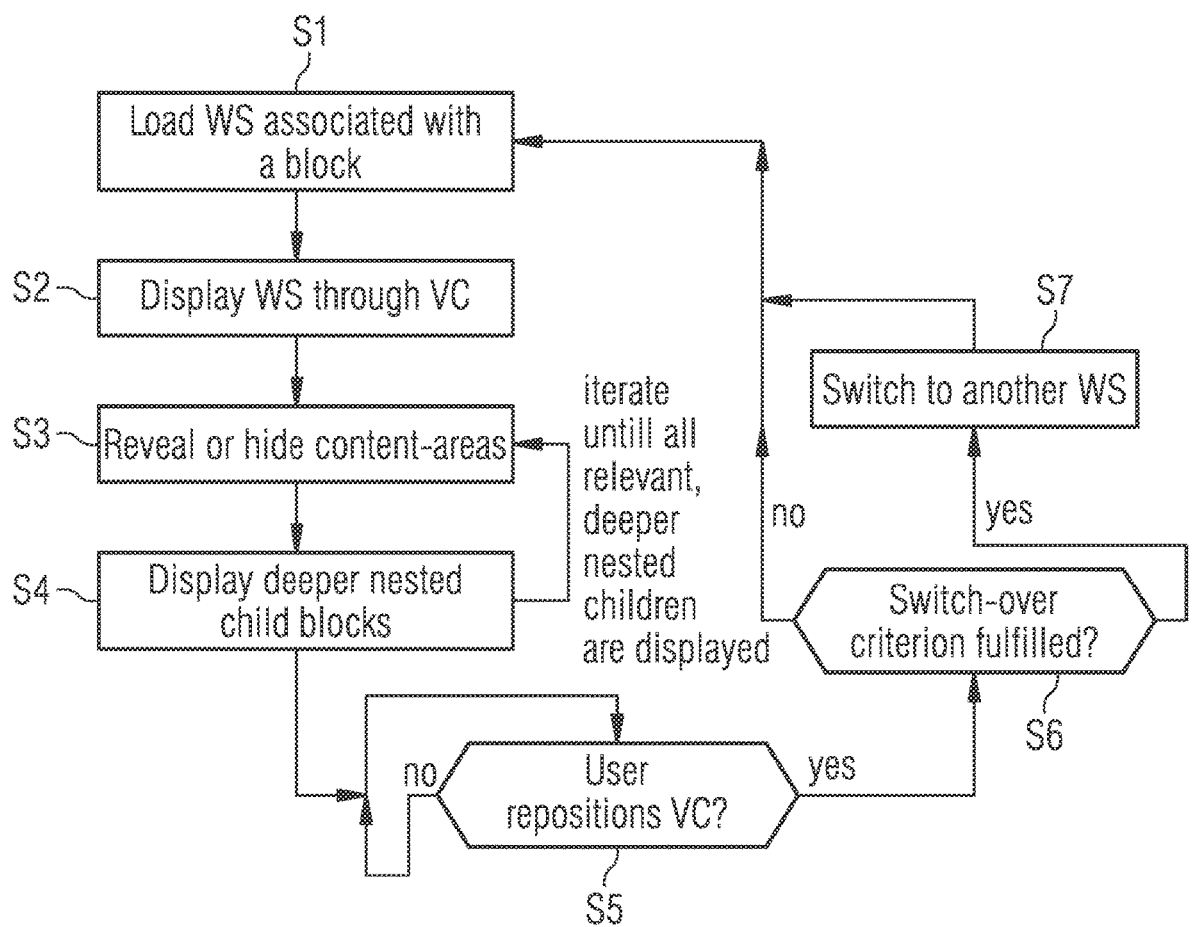
Figure 11A:
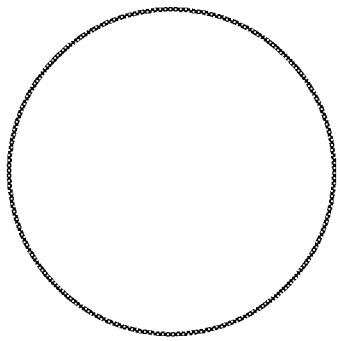
Figure 11B:
Figure 11C:
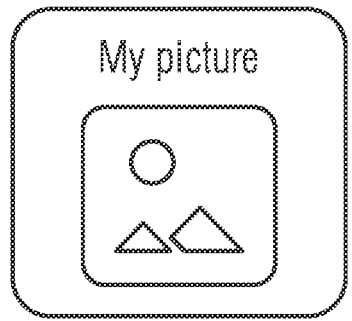

FIG. 6 illustrates a three-dimensional workspace of a block, B1, containing a scene of the block, B1, as well as a Cartesian coordinate system for the respective block, B1, and an associated virtual camera, $VC_{B1}$, of the block, B1, as well as the projection of a scene of child blocks, B1_x, of the respective block, B1, onto a screen of a display unit of a user interface according to the present invention;

FIG. 7 shows an example to illustrate different types of content areas;

FIG. 8 shows an example for illustrating a zooming operation performed by means of a human-machine interface according to the present invention;

FIG. 9 shows an example of a projection of deeper nested child blocks onto a screen via an intermediate virtual projection to illustrate the operation of a method according to the present invention;

FIG. 10 shows a further flowchart for illustrating a possible exemplary embodiment of a computer-implemented human-machine interaction method according to the first aspect of the present invention;

FIGS. 11A, 11B, 11C illustrate different types of blocks used by the computer-implemented method according to the present invention.

Figure 1:
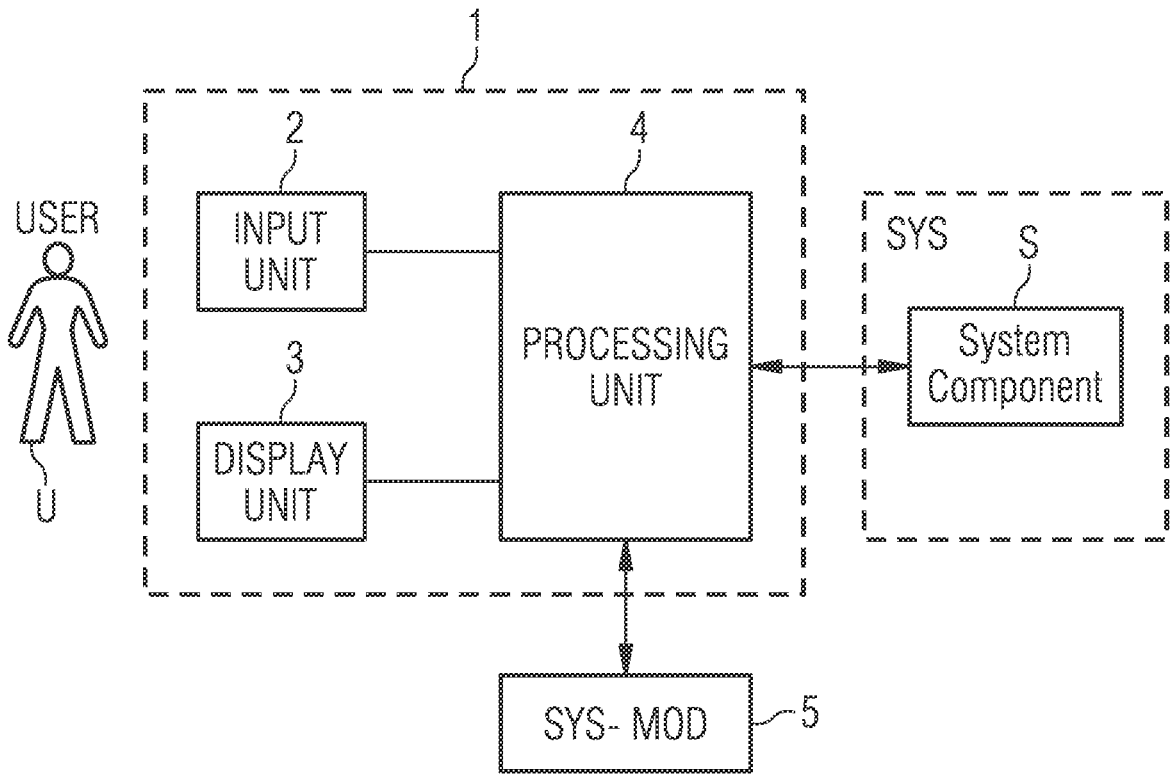
FIG. 1 shows a block diagram for illustrating a possible exemplary embodiment of a human machine interface used to control a complex system according to an aspect of the present invention.

FIG. 1 shows schematically an embodiment of a human-machine interface (HMI) 1 according to an aspect of the present invention comprising three main units. The human-machine interaction user interface 1 as shown in the embodiment of FIG. 1 comprises an input unit 2 adapted to receive user input commands and a display unit 3 having a screen adapted to display a scene within a three-dimensional workspace WS. The human-machine interface 1 further comprises a processing unit 4 connected to the input unit 2 and connected to the display unit 3. The processing unit 4 has access to a local or remote database 5 as illustrated in FIG. 1.

The input unit 2 can comprise a touch-sensitive screen. The input unit 2 can also comprise a computer mouse, a trackpad, a gesture-based control device, or any other kind of manually operative input entities.

The display unit 3 can comprise a computer monitor, a smartphone- or tablet-screen, a Virtual Reality VR display device or an Augmented Reality AR device.

Figure 2:
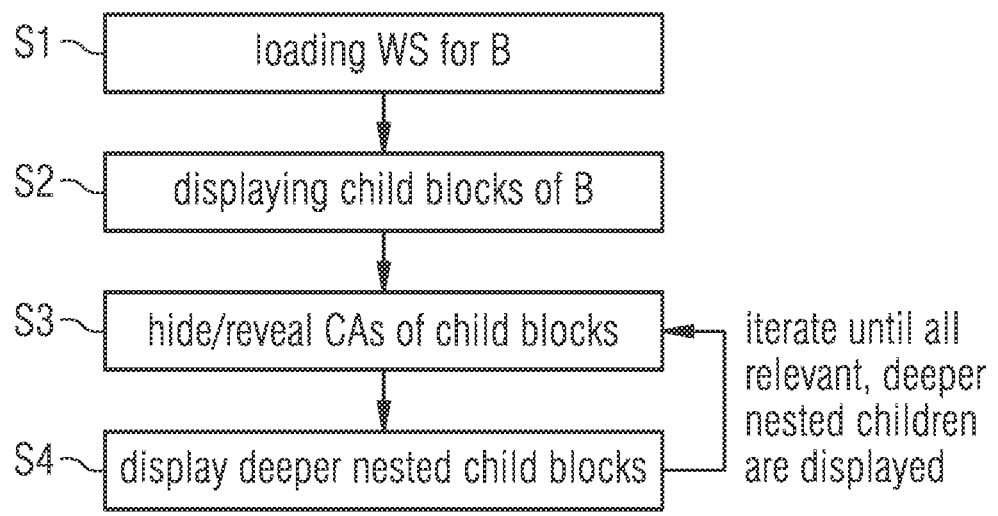
FIG. 2 shows a flowchart for illustrating a possible exemplary embodiment of a computer-implemented human-machine interaction method according to a further aspect of the present invention.

The processing unit 4 can reside in a computer, smartphone or tablet. It is preferably combined with a graphical processing unit GPU and performs the computer-implemented human-machine interaction method as illustrated in the flowchart of FIG. 2. The GPU is optimized for graphical calculations, like rendering 3D scenes or raytracing.

Figure 3:
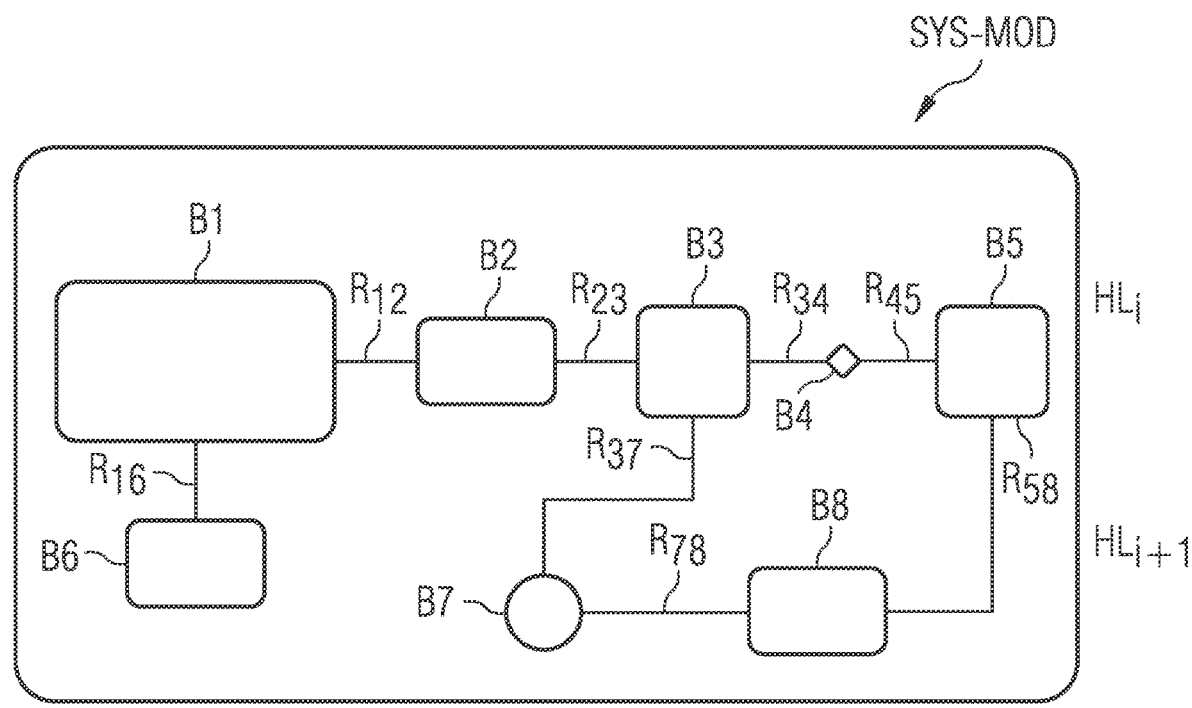
FIG. 3 shows an example of blocks and relations between entities of a data model.

The processing unit 4 of the human-machine interface 1 can be connected to at least one system component C such as a controller or an actuator within a complex technical system. The illustrated complex technical system SYS may for instance be a facility or manufacturing factory for producing products comprising a plurality of machines communicating with each other. The system component C as shown in FIG. 1 can be any kind of system component C, in particular a subsystem or circuit within the complex system SYS. The complex system SYS is represented by a hierarchical system model SYS-MOD stored in the database 5. An example for such a hierarchical system model SYS-MOD is illustrated in FIG. 5A. A complex system SYS can comprise a plurality of interrelated system components C interacting with each other for example physically, logically or on a functional base. Each system component C of the physical complex system SYS can be represented by a corresponding data object or data structure illustrated or represented by a block B in the hierarchical system model SYS-MOD as illustrated in FIGS. 3, 4, 5. The system component C can form a controller adapted to control in turn other system components C such as actuators within the complex system. The processing unit 4 of the human-machine interface 1 can also receive feedback data from some of the system components C such as sensor components within the complex system SYS to display state information about the momentary state of the system components C on the screen of the display unit 3 to a user.

With the human-machine interface 1 according to the present invention, blocks B representing system components C of the complex system SYS are displayed on a screen of the display unit 3 in the same or different hierarchical levels HLs. A user U can perform operations directly on a block B representing an associated physical system component C such as a circuit or machine in the complex system SYS. In a possible implementation, a sensitive content area of a block B displayed on a touch-sensitive screen of the display unit 3 can be pressed by a finger of the user to perform a control operation on the respective system component C integrated in the physical complex system SYS. A user input sensitive content area, CA, indicating a fault in the complex system, SYS, can be operated by pressing the sensitive area on a touch-sensitive screen to deactivate automatically a corresponding physical system component C in the complex system SYS to handle the fault. Accordingly, a user U can work directly on a multi-level hierarchical system model, SYS-MOD representing the complex system, SYS, loaded from the database 5 to trigger control actions in the complex system SYS. The human-machine interface 1 and the corresponding human-machine interaction method according to the present invention further allows a user U to zoom on a relevant block B representing a system component C of interest within the complex system SYS to retrieve information about this system component C and about its subcomponents at lower hierarchical levels.

The display unit 3 of the human-machine interface 1 comprises a screen to display a scene within a three-dimensional workspace WS associated with a block B representing the component C in the complex system SYS by means of a virtual camera VC associated with the respective block B and positioned in the three-dimensional workspace WS of the block B, wherein the virtual camera VC is moveable in the three-dimensional workspace WS of the associated block B in response to a user input command input into the input unit 2 of the user interface 1 to zoom on the respective block B and its content areas CAs.

The workspace WS is truly three-dimensional since each block B comprises three coordinates x, y, z as also visible in FIG. 9. The position of a block B in the coordinate system of the workspace WS is the position of a point at a center of the displayed frame of the respective block B.

Figure 5A:
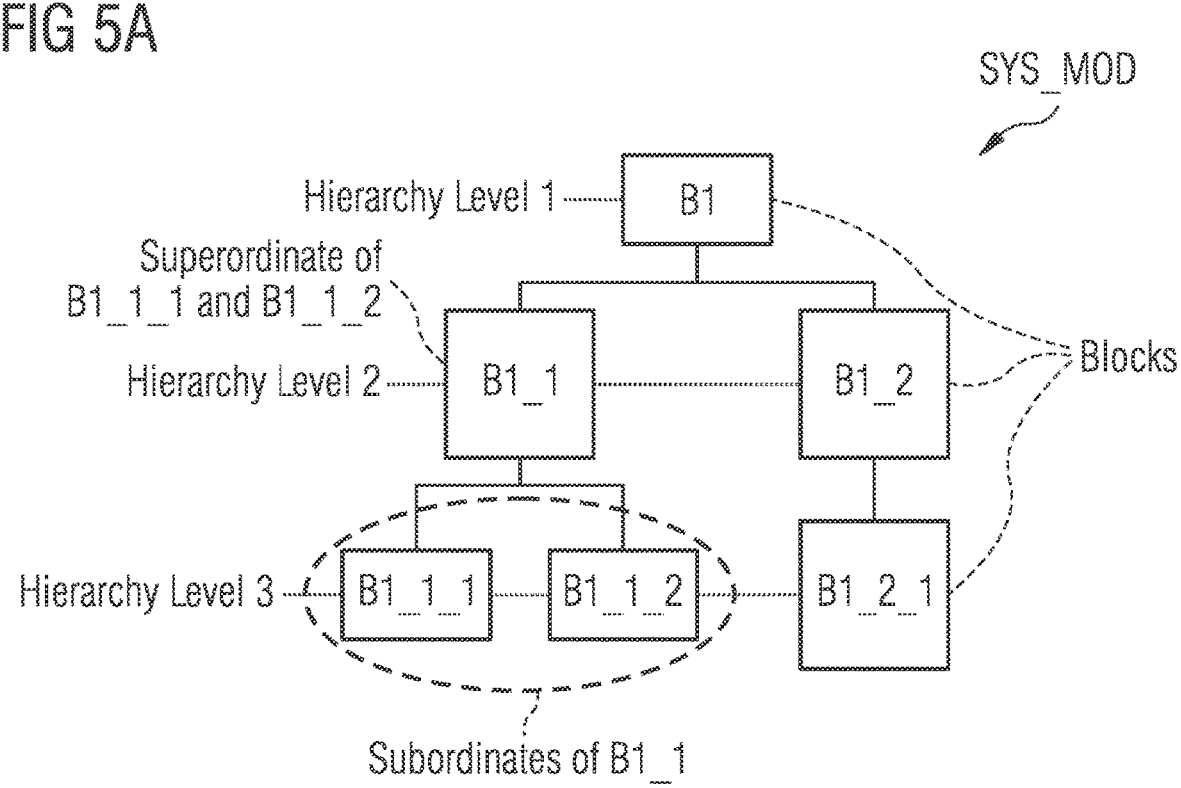
FIGS. 5A, 5B illustrate an exemplary hierarchical system model representing a complex system and a corresponding nested structure.
Figure 5B:
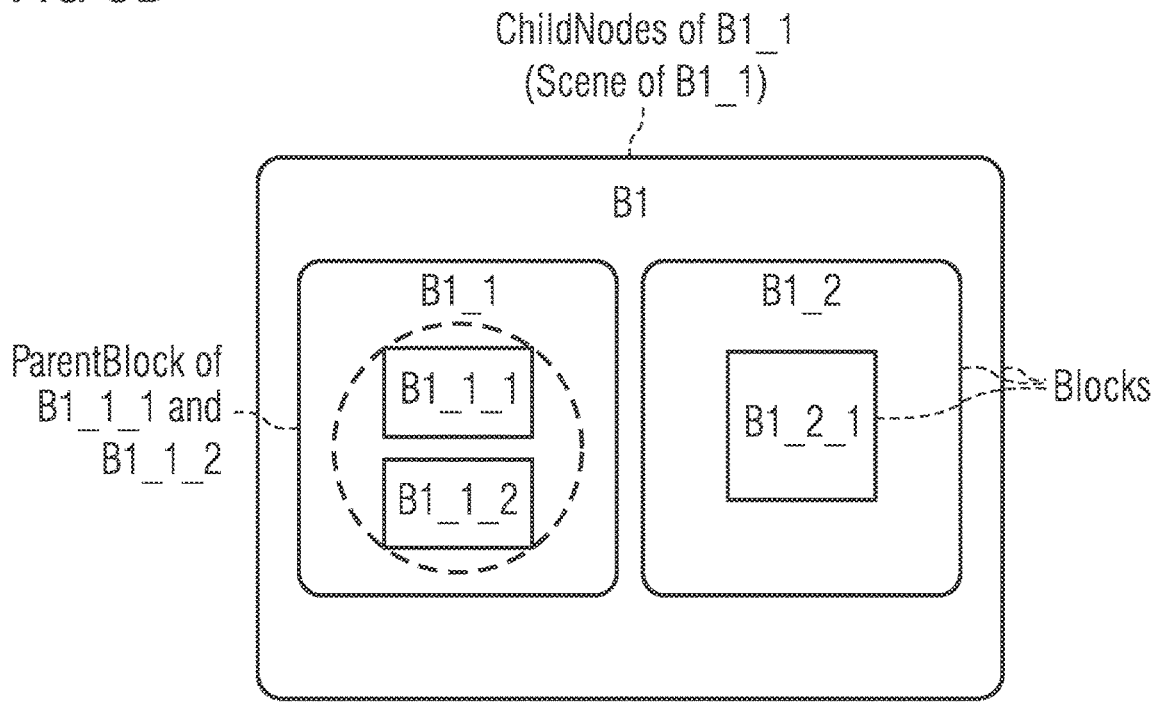

FIG. 2 shows a flowchart of a possible exemplary embodiment of a computer-implemented human-machine interaction method according to the second aspect of the present invention. The computer-implemented human-machine interaction method is used to assist the user to retrieve and possibly also to create information data about the complex system SYS as illustrated in FIG. 1 represented by a hierarchical system model SYS-MOD stored in the database 5. The hierarchical system model SYS-MOD can be displayed as a corresponding nested structure on the screen of the display unit 3 as also illustrated in FIGS. 5A, 5B. The hierarchical system model SYS-MOD loaded from the database 5 is processed by the processing unit 4 of the human-machine interface 1 to plan, monitor and/or to control system components C of the complex system SYS.

In the illustrated embodiment of FIG. 2, the computer-implemented human-machine interaction method comprises four main steps which are performed iteratively.

In a first step S1, a three-dimensional workspace $WS_{B1}$ associated with a block B1 is loaded using an associated unique URL of the block B1. The block B1 represents a system component C within the complex system SYS. The loaded three-dimensional workspace $WS_{B1}$ of the respective block B1 contains a scene of child blocks of the respective block B1 as also illustrated in FIG. 6. The child blocks B1_1, B1_2 of the block B1 are defined as subordinates of the respective block B1 in the hierarchical system model SYS-MOD of the complex system SYS stored in the database 5 and are positioned in the loaded three-dimensional workspace $WS_{B1}$ of the respective block B1.

In a further second step S2, the three-dimensional workspace $WS_{B1}$ is displayed by projecting the scene of child blocks B1_1, B1_2 of said block B1 onto the screen of the display unit 3 by means of a virtual camera $VC_{B1}$ associated to the block B1 which is positioned in the three-dimensional Cartesian coordinate system within the three-dimensional workspace $WS_{B1}$ of the block B1.

In a further step S3, content areas CAs of visible displayed child blocks of the respective block B1 are revealed or hidden automatically depending on a reveal/hide criterion, calculated by the at least one microprocessor of the processing unit 4 based on among others a size of the respective child block, a screen size of the screen of the display unit 3 and a distance d of the virtual camera $VC_{B1}$ associated with the respective block B1 and the respective child blocks B1_1, B1_2 of block B1.

In a further step S4, deeper nested child blocks corresponding to lower hierarchical levels of the hierarchical system model stored in the database 5 are displayed on the screen of the display unit 3 if a content area, CA, of a type children-area, CAT1, of a child block B1_1 is revealed, by projecting the scene of child blocks B1_1_1, B1_1_2 of the respective child blocks B1_1 of the block B1 onto the screen of the display 3 unit via an intermediate, virtual projection of the scene of child blocks B1_1_1, B1_1_2 of the child block B1_1 onto the respective child block B1_1, as also illustrated in the example of FIG. 9.

The third step S3 and fourth step S4 are repeated until all child blocks and associated content areas CAs are displayed on the screen of the display unit 3 according to the reveal/hide criterion used in the corresponding step.

FIG. 3 shows an example of a model comprising blocks B and connections or relations connecting blocks. The blocks B are primary components of data objects (building blocks) to which content areas CAs can be created. The blocks B can be used for different use cases and can be customized as illustrated for instance in FIG. 11. Blocks B are visually displayed as geometrical shapes changeable in three dimensions of a workspace WS. Blocks B can also be styled with respect to their color, border or shape. From a technical point of view, blocks B form data points and containers for content. Within each block B information or data can be organized in content areas CAs. Content areas CAs do divide blocks B into sections in which different types of information or data can be stored and can be displayed via the screen of the display unit 3. The division of the content areas CAs is preferably done by rows and columns as also illustrated in FIG. 7. Each block B comprises an associated three-dimensional workspace WS. Each block B represents in a possible implementation a system component C of the complex system SYS. The complex system SYS is composed of many components which may interact with each other. Complex systems SYS are systems whose behavior is intrinsically difficult to model due to the dependencies, competitions, relationships and other types of interactions between their parts or components and/or between a given system and its environment. In any case, it is possible to represent such a system SYS as a network where nodes represent the component C and links represent the interactions between the components C.

A complex system SYS is represented by the hierarchical system model SYS-MOD stored in the database 5. A hierarchical system model is a model in which lower hierarchy levels are assorted under a hierarchy of successively higher level units. A three-dimensional workspace WS is associated with a block B in which child blocks (the scene) of the respective block B can be created and modified by a user via the human-machine interface 1. The workspace WS contains the scene, the coordinate system and a virtual camera VC each associated with a corresponding block B.

A block B can be a parent block and/or at the same time a child block of at least one other block. A parent block is a block that is one hierarchy level HL above the block under consideration. The parent block and the child block are connected with each other along a child-parent relation R. A child block is a block that is one hierarchy level below and a subordinate of a block under consideration. The content areas CAs divide the blocks B into sections in which different types of information are stored and can be displayed. All child blocks within a three-dimensional workspace WS associated to a block B form a so-called scene. Each block B has an associated virtual camera VC. The virtual camera VC associated with the block B is positioned in the three-dimensional workspace WS of this block B. With the virtual camera VC, the scene of the workspace WS of the block B can be projected onto the screen of the display unit 3 or onto the block B itself.

Each block B contains a predefined number of content areas CA which can be of different content area types CATs. These content areas CAs are arranged in rows and columns and content areas are revealable or hideable according to a predefined reveal/hide criterion. This reveal/hide criterion can be calculated by a microprocessor of the processing unit 4 of the human-machine interface 1 in real time based on the size of a respective child block, a screen size of the screen and/or a momentary distance d between the virtual camera VC associated with the respective block B and the respective child block of said block B. The distance d can be calculated by a processor of the processing unit 4 as an euclidean distance between the position of the virtual camera VC and the position of a center point of the block B at the center of the frame of the block B.

In a possible embodiment, there are four main different content area types CATs of content areas CAs which can form part of a block B within the hierarchical system model SYS-MOD stored in the database 5.

A first content area type (children-area type) CAT1 is adapted to indicate deeper nested child blocks of the respective block B.

A second content area type (data-area type) CAT2 contains content data such as text content data or image content data. The content area of this type can be used to display any kind of content providing information about the complex system SYS.

A third content area type CAT3 of the content area does contain dynamic data provided by a third party services via API. This third content area type can also be referred to as a dynamic-area content type. It reflects changes of data provided by the associated API and can send changed data back to the API.

A further fourth content area type CAT4 which can also be referred to as a user control input area type forms a content area being sensitive to a user's input and is adapted to generate automatically at least one control signal CRTL if the user input sensitive area is selected in response to a user selection command such as touching the displayed user input sensitive content area by a touch-sensitive screen of the human-machine interface 1. Accordingly, each content area CA can hold different types of data.

Content areas of type CAT2 comprise among others text or image areas as displayed for instance in FIG. 7. Content areas of type CAT3 form for example data areas that display user-defined values or data provided by a third party service via API. A special kind of content area is a content area of type CAT1 used for showing nested structures.

Connections or relations R are links between different blocks B. Visually, connections can be displayed as lines on the screen of the display unit 3 as shown in FIG. 3. Different arrow heads can be displayed at their ends to support different model building standards. Further, labels can be manually added or assigned automatically to describe the respective connection or relation R between two blocks. From a technical point of view, connections represent a relationship R of various kinds between these two blocks B.

Relations R between two blocks B can be assigned in the system model SYS-MOD by a user U having access rights to both blocks. The relations R can comprise intra-level relations in the same hierarchical level and inter-level relations between different hierarchical levels, in particular between adjacent hierarchical levels.

The computer-implemented method according to the present invention is adapted to support the creation of diagrams within three dimensions of a workspace WS. For instance, the position of blocks B within a workspace WS can be set using Cartesian coordinates x, y, z in a Cartesian coordinate system. The computer-implemented method can place the relations or connections between blocks B according to their positions and can take automatically z-displacements along a z-axis within the three-dimensional workspace WS into account.

The virtual camera VC for a block B can be positioned and moved in the three-dimensional workspace WS of the associated block B in response to a user command or gesture input into the input unit 2 of the user interface 1. It is also possible that the virtual camera VC is moved in the three-dimensional workspace WS of an associated block B in response to a command from a control unit forming a physical component C of the complex system SYS and represented by an associated block B in the hierarchical system model SYS-MOD.

FIGS. 6, 9 illustrate a zooming operation of a virtual camera $VC_{B1}$ associated with a selected block B1. The virtual camera $VC_{B1}$ of FIGS. 6, 9 can move in all directions within the coordinate system or workspace $WS_{B1}$ of the associated block B1. The three-dimensional workspace $WS_{B1}$ of block B1 does contain the scene of block B1. Further, the three-dimensional workspace $WS_{B1}$ of block B1 contains also the virtual camera $VC_{B1}$ of block B1. If the virtual camera $VC_{B1}$ is moved in the z-direction of the coordinate system of the workspace $WS_{B1}$ perpendicular towards projection of the scene of child blocks B1_1, B1_2 of block B1, the projection of deeper nested child blocks B1_1_1, B1_1_2, B1_2_1 onto the screen via an intermediate, virtual projection is performed as illustrated in FIG. 9.

During a zooming operation, the virtual camera $VC_{B1}$ belonging to an associated block B1 can be moved in the workspace $WS_{B1}$ of the respective block B1 in response to a zoom user command input into the input unit 2. This can be for instance performed by a scroll gesture such as a two-finger pan command performed on the track pad or via a mouse wheel operation. Virtual camera movements of the virtual camera VC can also be controlled by means of drag gestures or commands. A most commonly used camera control command for controlling the virtual camera VC in the workspace WS can also be referred to as map control and means that the view direction of the virtual camera VC is always directed perpendicularly at the work surface without rotating.

In addition to the virtual camera VC, each block B can comprise child blocks. Each child block has its own virtual camera VC so that child blocks are correctly represented in perspective on the respective parent block. Because child blocks are in turn blocks themselves they can also contain other child blocks. Accordingly, it is possible to nest blocks infinitely. This is also illustrated in FIG. 9. In the illustrated example, block B1 comprises two child blocks B1_1 and B1_2. Each of the two child blocks B1_1, B1_2 comprises in turn child blocks of their own. Child block B1_1 comprises child blocks (grandchildren) blocks B1_1_1 and blocks B1_1_2. Further, child block B1_2 of block B1 has a single child block (grandchild) B1_2_1. Block B1 forms the root block having an associated virtual camera $VC_{B1}$. The projection of a scene of block B1 on the screen of the display unit 3 is performed as illustrated in FIG. 9. Child blocks of block B1 (B1_1 and B1_2) are projected on the screen via the virtual camera $VC_{B1}$. Deeper nested child blocks (grandchildren) would need to be projected on their respective parent block first.

This projection is done virtually to calculate the resulting smaller size and relative position of the deeper nested child blocks on the main scene. This technique is called intermediate projection. An advantage of this approach is performance-based. The intermediate, virtual projection of a child block has to be calculated only once during a first rendering. The change of the main camera does not require a recalculation.

Since the virtual camera $VC_{B1}$ of block B1, i.e. the main camera, does still focus on the main scene and child blocks are only projected virtually, a too deep zooming operation would in a conventional way cause the virtual camera VC to pierce through the plane of the main scene and blocks would no longer be visible. Accordingly, with the computer-implemented human-machine interaction method if a predefined switchover criterion is fulfilled, a switching from a current three-dimensional workspace $WS_{B1}$ and the virtual camera $VC_{B1}$ associated with the block B1 to another three-dimensional workspace $WS_{B1\_1}$ and to the virtual camera $VC_{B1\_1}$ associated with a child block B1_1 of the respective block B1 is performed automatically and seamlessly. In the example illustrated in FIG. 9, if a predefined switchover criterion is fulfilled, for instance if the distance d between the virtual camera $VC_{B1}$ within the workspace $WS_{B1}$ of block B1 and the projected child block B1_1 is reduced so far that it is lower than a predefined distance threshold TH, the switching over from the virtual camera $VC_{B1}$ to the virtual camera $VC_{B1\_1}$ is performed automatically in the workspace. This is accompanied by an automatic change of the URL on the URL associated with block B1 to the URL associated with the child block B1_1. Each block B in the hierarchical system model SYS-MOD stored in the database 5 comprises in a preferred embodiment a unique block identifier and a uniform resource allocator URL reflecting the hierarchical structure of the hierarchical system model SYS-MOD stored in the database 5. Each block B may contain additional information such as the user-ID of the user who created the block B and who may have exclusive access write rights or a time stamp when the block B was updated by a user.

In the example of FIG. 9, if a predefined switchover criterion is fulfilled, switching from a current three-dimensional workspace $WS_{B1\_1}$ and the virtual camera $VC_{B1\_1}$ associated with the block B1_1 to another three-dimensional workspace $WS_{B1}$ and to the virtual camera $VC_{B1}$ associated with the parent block B1 of child block B1_1 can be performed automatically or semi-automatically. This can be accompanied by a resulting change of the URL from the URL associated with the child block B1_1 to the URL associated with the block B1 (zooming out). Consequently, the computer-implemented method provides both for an effective zooming in and zooming out operation in response to a zoom user command input into the input unit 2 of the user interface 1. If the virtual camera $VC_{B1}$ associated with block B1 in the hierarchical system model SYS-MOD is moved in response to a zoom user command towards a child block B1_1 of the respective block B1 to reduce the distance d between the virtual camera $VC_{B1}$ and the child block B1_1 within the three-dimensional workspace, projections are performed as illustrated in FIG. 9. The virtual camera $VC_{B1}$ associated with the block B1 in the hierarchical system model SYS-MOD can be moved in a possible embodiment in response to a pan user command input into the input unit of the user interface in the three-dimensional workspace $WS_{B1}$. Each block B comprises a real three-dimensional position in the workspace WS, i.e. three coordinates x, y, z in a Cartesian coordinate system as also shown in FIG. 9. For example, the first child block B1_1 has a 3D-position (x=-10; y=0; z=0) and the other child block B1_2 of block B1 has the position (x=10; y=0; z=20).

The virtual camera $VC_{B1}$ associated with block B1 in the hierarchical system model SYS-MOD can also be rotated in a possible embodiment in response to a rotation user command input into the user interface 1 in the three-dimensional workspace $WS_{B1}$ of block B1 around the current camera position of the virtual camera $VC_{B1}$.

A switchover from the first virtual camera $VC_{B1}$ associated with a first block B1 to another virtual camera $VC_{B2}$ associated with another block B2 can also be performed automatically in a possible embodiment using the uniform resource locators URL of the respective blocks, i.e. selecting the URL of the second block B2 in the system model. The computer-implemented method according to the present invention therefore allows also for direct block navigation between different blocks B in the hierarchical system model. A hierarchical structure can be reflected by the uniform resource locator URL of the respective block B. This means that deeper levels of the block structure are not only reachable via a zoom operation but can also be reached directly in a kind of jump operation via selecting the URL of the respective block B. If a block URL is accessed directly the corresponding block B can be entered. This means that only those blocks being in the hierarchical level HL below the entered block B are displayed. By combination with the URL structure, this does enable sharing specific levels of the block structure with other participating users.

Figure 4A:
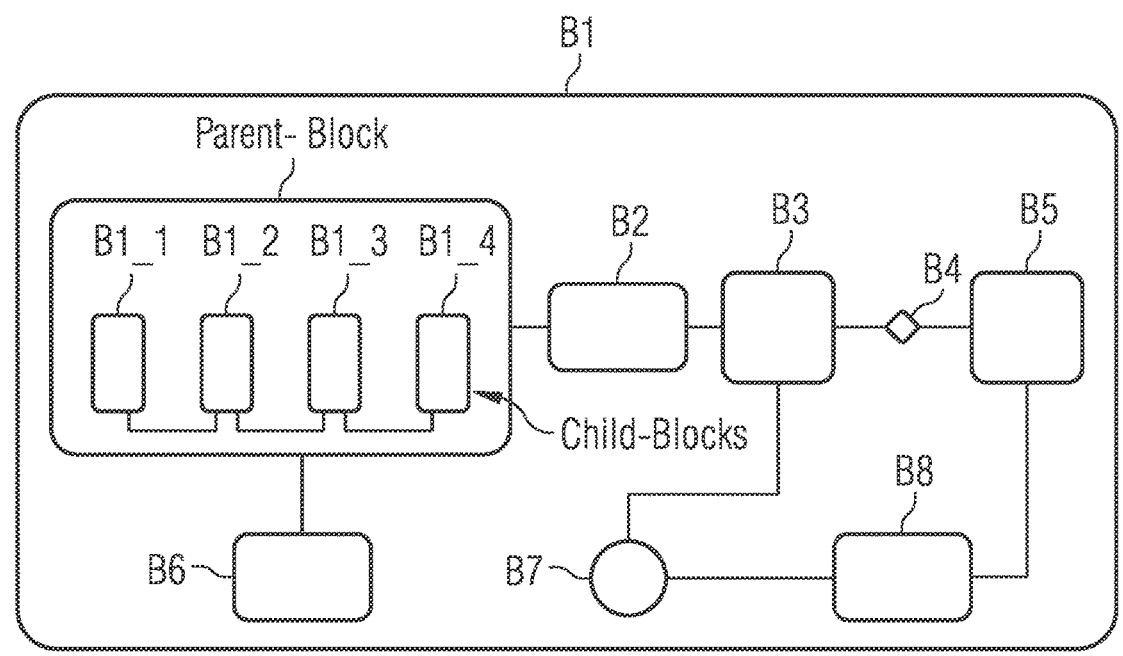

FIG. 4A shows nested blocks B, in particular a parent block B1 comprising several child blocks B1_1, B1_2, B1_3, B1_4. When zooming on the parent block B1, nested blocks within the child blocks become visible. This is also illustrated in FIG. 4B. The child areas of the first type CAT1 allow blocks to be nested inside each other and thus to create a parent-child relationship R between them as shown in FIG. 4A. By zooming-in on a parent block deeper nested child blocks are revealed as illustrated in FIG. 4B. In contrast, by zooming out, deeper nested child blocks are hidden and the parent structure is displayed. The blocks B can show different styles or shapes, e.g. a block B with a round block frame as also explained in context of FIG. 11A.

The hierarchical block structure can be reflected by a web browser URL as illustrated in FIG. 4C. For instance, block B142 can be directly reachable via URL:/block1/block14/block142. Accordingly, the uniform resource allocator URL does reflect the hierarchical structure of the hierarchical system model SYS-MOD stored in the database 5. By selecting the URL of a block B, a direct jump to the respective block B7 and its virtual camera $VC_B$ can be achieved automatically.

In a possible embodiment, each block B comprises a user-defined rights-management with which a user U can give other participating users U' read or write access to the workspace $WS_B$ associated with the block B by means of an URL associated with the respective block B. The user-defined rights-management setting can be passed down to direct child blocks and deeper nested child blocks of the respective block B as long as no other user-defined rights-management setting is applied to a child block or deeper nested child block of said block B.

In a possible embodiment, two blocks (B5 and B9) that exist on a different part of the hierarchical system model SYS-MOD can be connected with a connection or relation R, as illustrated in FIG. 4C. In this case, R bridges multiple hierarchical levels or branches of the hierarchical system model SYS-MOD. To be able to see both ends of R, a portal can be created, which opens the view to the relevant section of the parent block of B9.

If a user U has write access to a block B he may perform different operations according to its access right. For instance, a new child block of a block B can be created by the user within the workspace $WS_B$ associated with the block B if the respective user U has received a write access to the block B. Further, the user having a write access applied to the block can change the style of a child block of block B comprising among others background-color, border-color and/or border-radius which is editable by the user U within the workspace $WS_B$ associated with the respective block B. Further, the size of a child block of block B can be changed by the user U within the workspace $WS_B$ associated with the block B if this user U has a write access to the block B. Moreover, the position of a child block of block B can be changed via a drag operation or entering the position directly by the user U within the workspace $WS_B$ associated with the block B provided that the user U has the necessary write access rights to the respective block B. The hierarchical position of a child block of block B can also be changed automatically via a drag and drop operation by the user U within the workspace $WS_B$ associated with the block B if the user U has a write access right to the respective block B and the new parent block to which the child block is moved to. The hierarchical URL of the block shifted in the hierarchical structure of the system model SYS-MOD is adapted automatically to the new position of the block B. Further, new content areas CAs for a child block of a block B can be created by the user U within the workspace $WS_B$ associated with the block B provided that the user U has the necessary write access rights to the respective block B. The content areas CAs within the type "data-area", CAT2, of a child block of block B can be edited by the user in response to a user selection command on the respective content area CA within the workspace $WS_B$ associated with the block B provided the user U has the necessary write access right to the block B. The editing actions of a user U working in the workspace WS of a block B can be mirrored in a possible embodiment in real time to other users U' viewing the same workspace WS in fractions of seconds so that a collaborative editing of the workspace WS in real time is made possible by the computer-implemented method according to the present invention.

The hierarchical system model SYS-MOD stored in the database 5 can be displayed as a corresponding nested structure on the screen of the display unit 3. The hierarchical system model SYS-MOD can be based for instance on the unified modeling language UML or the systems modeling language SysML. The hierarchical system model SYS-MOD can therefore also be imported and exported via data interfaces. The structures of the UML or SysML model can be displayed in the three-dimensional workspace WS and the hierarchical relations as nested structures.

In a preferred embodiment of the computer-implemented human-machine interaction method according to the present invention and of the human-machine interface 1, the processing unit 4 comprises a graphics processing unit GPU. Calculations to display three-dimensional workspaces $WS_B$ associated with blocks B can be performed on the graphics processing unit GPU which is optimized for calculations of three-dimensional scenes and provides a high computation performance. Consequently, operations performed by the user U, in particular the generation of control signals for system components C of the physical complex system SYS, can also be performed in real time.

If the content area CA of a user control input area type CAT4 of a block B is selected in response to a user selection command, the generation of at least one control signal CRTL can be triggered and the triggered control signal CRTL can be supplied by the processing unit 4 of the human-machine interface 1 to a controller integrated in the complex system SYS as a system component C or to an actuator forming another kind of component C of the complex technical system SYS.

In a possible embodiment, blocks B can also be created using block templates. Such a block template defines an appearance of a content area structure and the possible behavior of the block B that has been created using this template. A change of the block template can also result in an automatic update of all blocks B having been created with this block template. Block templates can be used to provide a user with standard blocks (for example UML blocks) as well as customized blocks for special use cases. Block templates can be created by a user U himself and/or exchanged with other users U' in a kind of block marketplace through a data network such as the Internet. Block templates can also be loaded from the database 5 if required. A user U may input a block template selection command to retrieve the block template from the database 5. On the basis of the loaded block template, the user U then can customize the block B for the use case. The generated block B can be inserted into the hierarchical system model SYS-MOD with assigned relations R to other blocks in the model SYS-MOD. A corresponding hierarchical URL for the inserted new block B can be generated automatically.

The displayed blocks are in a preferred embodiment zoom-sensitive. Accordingly, blocks B can react to changes in distance d from the current camera position of their associated virtual camera VC by displaying more or less of their content areas CAs as illustrated for example in FIG. 8. When zooming on a block B1 on the screen, the block B1 appears larger on the screen and there is more space or area available to display content. On the other hand, when zooming out, the block B1 appears smaller on the screen and content is hidden accordingly. In the illustrated example of FIGS. 7, 8, the technical component C of the complex system SYS is a satellite consisting of a plurality of subsystems and components. The important information relating to the technical component is displayed on the associated block B1. In most cases, this is the unique name of the block B. In the example of FIG. 7, the name of the block is "satellite". By zooming on the block B1 as shown in FIG. 8, more information concerning an associated component satellite becomes visible such as its current speed, i.e. 100 mph. The displayed information can comprise real-time sensor data indicating in the given example a current relative speed of the satellite in an orbit. This data can be provided by service providers and/or by sensors of the system component C itself.

FIG. 7 illustrates different content area types CATs of content areas CAs within such a block B1. In the illustrated example, the block B1 has a content area CA3 adapted to indicate deeper nested child blocks of the respective block B (children-area)(i.e. content area type (CAT1). In the illustrated block B1 of FIG. 7, further comprises a content area CA1 of a second content area type CAT2 containing content data such as text, in particular the name of the corresponding physical component "satellite". In the illustrated example, the block B1 further comprises a further content area CA2 containing also content data, in this example a picture or image of the corresponding physical component "satellite". The block B1 such as illustrated in FIG. 7 may contain further content areas CAs of other content area types CATs, in particular dynamic content areas of the third type CAT3 containing dynamic-data provided by a third party services via API or from sensor components C of the monitored technical system SYS. Further, the block B1 as illustrated in the example of FIG. 7 can comprise a fourth content area type CAT4 providing a user's input sensitive content area adapted to generate automatically at least one control signal CRTL if the user U does select the input sensitive content area by a user selection command such as touching the displayed content area CA of the touch-sensitive content area type CAT4. For instance, the block B1 shown in FIG. 7 comprises a user sensitive content area CA4 which allows to control the relative speed of the satellite in the orbit by sliding over the sensitive area to increase for instance the orbit speed from 100 mph to 105 mph. This value change triggers automatically a control signal CRTL which is supplied from the processing unit 4 of the user interface 1 to a satellite base station via a data network, wherein the base station forwards the control signal CRTL to the physical orbiting satellite to change the speed of the satellite. Accordingly, the block diagram B1 representing the satellite does not only provide information about the current state of the satellite but also allows to control the physical performance parameters and behavior of the satellite in the orbit. Further, if the displayed current relative speed of the satellite in the orbit becomes critical and falls beneath a predefined threshold value such as 95 mph, an alarm can be triggered automatically by a sensor of the physical satellite or by the satellite base station and supplied to the processing unit 4 of the human-machine interface 1 to display a warning signal on a dynamic-data content area of the third type CAT3 of the block B1 representing the satellite. A user or operator at the ground control can then zoom in on a child block of the block B1 representing a subsystem of the satellite showing a system component C which influences the speed of the satellite. The operator may zoom on these subsystems to handle the speed problem of the satellite.

FIG. 11 shows different examples for different types of blocks B. The different blocks B can comprise different shapes such as a circle in FIG. 11A, a rectangle in FIGS. 11B and 11C. The block B illustrated in FIG. 11A does not comprise any content. The block as shown in FIG. 11B has a content area with the content "Hello universe" forming a text content. The block B illustrated in FIG. 11C wherein a first content area CA1 includes a text content "My picture" and a second content area CA2 comprises an image.

FIG. 10 shows a further flowchart for illustrating a computer-implemented human-machine interaction method according to the first aspect of the present invention. FIG. 10 shows that the steps S1, S2, S3, S4 are performed iteratively. In the illustrated embodiment of the computer-implemented human-machine interaction method in a first step S1, the three-dimensional workspace $WS_{B1}$ associated with a block B1 is loaded using an associated unique URL of the block B1. The workspace $WS_{B1}$ of the block B1 is displayed in step S2 to the associated virtual camera $VC_{B1}$ of the block B1.

In a further step S3, the content areas CAs of the block B1 are revealed or hidden depending on the reveal/hide criterion calculated by a microprocessor of the processing unit 4 of the human-machine interface 1 in a possible embodiment depending on the screen size of the screen of the display unit 3 and a current calculated distance d between the virtual camera $VC_{B1}$ associated to the block B1 and child blocks of the respective block B1.

In a further step S4, deeper nested child blocks are displayed.

In a further step S5, it is checked whether the virtual camera $VC_{B1}$ of the block B1 has been repositioned within the workspace $WS_{B1}$ of the block B1.

In a further step S6, it is checked whether a predefined switchover criterion has been fulfilled. If this is not the case, the routine returns to step S1. In contrast, if the switchover criterion has been fulfilled, an automatic switchover in another workspace WS and virtual camera VC is performed in step S7.

In the human-machine interaction user interface 1 according to the present invention, the processing unit 4 comprises in a preferred embodiment a graphical processing unit GPU which is optimized to calculate a real three-dimensional scene. In a possible embodiment, a 3D engine can be used. This allows to render 3D objects (such as CAD data) and to render a scene in a virtual space (augmented reality/virtual reality).

In the computer-implemented method according to the present invention, hierarchical levels are displayed by projecting them onto their parent blocks. With the method according to the present invention, it is possible to position objects with three dimensions in a Cartesian coordinate system in a three-dimensional position (x, y, z). Other coordinate system may also be used. With the computer-implemented method according to the present invention child blocks are visually displayed within a frame of a parent block. In this way, the relationship between a child block and a parent block is evident.

With the method according to the present invention, it is possible that several users can operate simultaneously in the same workspace WS using different user terminal devices connected via a data network to a common server. Each of the user terminals may comprise a human-machine interaction user interface 1 according to the present invention. A change of operation performed by one user is imminently visible to any other participating user. This allows for collaborative work on a common complex technical system SYS in real time.

Users U can be stakeholders having exclusive or not exclusive write access rights to a group of blocks B within the system model SYS-MOD which they may have created by means of a block template.

The computer-implemented method according to the present invention does enable the representation of information on a limited real area of a screen of a display unit 3. The screen can comprise for instance a screen of a tablet, laptop, computer or a smartphone. The virtual z-axis in the workspace WS can be used to display on the screen of the display unit 3 detailed information that specifies a certain system component C and associated meta information data. The input unit 2 of the human-machine interface 1 may comprise for instance a mouse having a scroll wheel or a touchpad. A user U can change a position of the virtual camera VC associated with a block B in the three-dimensional workspace WS along the virtual z-axis. Further, the camera position as displayed on the screen of the display unit 3 in the x- and y-axis within the Cartesian coordinate workspace WS can be changed simultaneously by the user. Accordingly, a user U can zoom in or zoom out according to an input user command. Accordingly, the human-machine interface 1 provides a zoom reveal or hide three-dimensional interface for component-based diagrams increasing the efficiency for controlling and monitoring any kind of technical system SYS such as a vehicle, a satellite or a machine or a facility. The control can be performed by using directly a diagram representing the physical system SYS according to the hierarchical structured model of the respective system.

The reveal/hide criterion for content areas CAs can be based on further factors such as an optimal amount of information data to be displayed on the screen of the display unit 3. In a possible embodiment, the hierarchical system model SYS-MOD stored in the database 5 can also be linkable to blocks B on different parts of the hierarchical system model SYS-MOD stored in the database 5 (not hierarchy levels). Each block B in the hierarchical system model SYS-MOD stored in the database 5 can represent a hardware component such as an electronic circuit or a software component of the complex technical system SYS wherein each child block of such a block B can represent a subcomponent represented by the block forming a parent block of the respective child block.

The computer implemented method according to the present invention can be applied to plan, monitor and control distributed systems.

The computer implemented method according to the present invention can be used to design complex technical systems applying methods of model-based systems-engineering making for example relations between different domains like requirements and logical structures visible and thus understandable to a user, U, or being used by a user, U to create common understanding of the complex technical system with another user, U'.

The computer implemented method according to the present invention can be used to plan and monitor processes and workflows in organizations, for example supporting methods of model-based enterprise.

The invention claimed is:

1. A computer-implemented human-machine interaction method used to assist a user to retrieve and create information about a complex system represented by a hierarchical system model stored in a database and displayed as a corresponding nested three-dimensional workspace structure on a screen of a display unit of a human machine interaction, HMI, user interface, said screen having a limited screen size and a limited screen resolution, wherein said hierarchical system model is processed to plan, monitor and control said complex system, wherein the computer-implemented human-machine interaction method performs the following steps iteratively to provide a seamless semantic zoom between infinite nested three-dimensional workspaces representing the hierarchical system model;

loading in a first step a three-dimensional workspace associated with a selected parent block using an associated, unique URL, representing a system component of said complex system, wherein the loaded three-dimensional workspace of said parent block contains a scene of deeper nested child blocks of said parent block defined as subordinates of said parent block in the hierarchical system model stored in the database and positioned in the loaded three-dimensional workspace of said parent block;

displaying in a second step the three-dimensional workspace by projecting the scene of deeper nested child blocks of said parent block onto the screen of the display unit by means of a virtual camera associated to said parent block which is positioned in a three-dimensional coordinate system within the loaded three-dimensional workspace of said parent block;

revealing or hiding in a third step content areas of visible displayed child blocks of said parent block depending on a reveal/hide criterion, wherein the reveal/hide criterion is calculated by a microprocessor of a processing unit of the HMI user interface in real time based on among others the size of the respective child block, the screen size of the screen of the display unit and based on the distance between the virtual camera associated to said parent block and the respective child block of said parent block wherein the distance is calculated as an Euclidean distance between the position of the virtual camera and the position of a center point of the block; and displaying in a fourth step deeper nested child blocks corresponding to lower hierarchical levels of the hierarchical system model stored in the database if a content area of a children-area type of a child block is revealed based on the reveal/hide criterion, by projecting the scene of deeper nested child blocks of the respective child blocks of the parent block onto the screen of the display unit via an intermediate, virtual projection of the scene of deeper nested child blocks of child block onto said child block;

repeating the third step and the fourth step until all deeper nested child blocks and associated content areas are displayed according to the reveal/hide criterion used in the third step and in the fourth step, wherein in a zooming operation to zoom in or to zoom out across an infinite number of hierarchical levels of the hierarchical system model the virtual camera of the selected parent block is moved in a z-direction of the coordinate system of the three-dimensional workspace of the selected parent block perpendicular towards projection of the scene of deeper nested child blocks of said parent block wherein in a zooming-in operation if a predefined switchover criterion is fulfilled a switching from a current three-dimensional workspace and the virtual camera associated with the parent block to another three-dimensional workspace and to the virtual camera associated with a child block of said parent block is performed automatically and seamlessly, wherein in a zooming-out operation if a predefined switchover criterion is fulfilled a switching from a current three-dimensional workspace and the virtual camera associated with a child block to another three-dimensional workspace and to the virtual camera associated with the parent block of said child block is performed automatically and seamlessly.

2. The computer-implemented human-machine interaction method according to claim 1 wherein the virtual camera of the selected parent block is positioned and moved automatically in the three-dimensional workspace of the associated parent block in response to a user command input into an input unit of the HMI user interface or in response to a command received from an external controller, in particular from a controller forming a system component of said complex technical system or from a sensor component of the complex technical system.

3. The computer-implemented human-machine interaction method according to claim 1 wherein in the zooming-in operation a switching from a current three-dimensional workspace and the virtual camera associated with the parent block to another three-dimensional workspace and to the virtual camera associated with a child block of said parent block is accompanied by an automatic change of URL from the URL associated with said parent block to the URL associated with the child block.

4. The computer-implemented human-machine interaction method according to claim 1 wherein in the zoom-out operation a switching from a current three-dimensional workspace and the virtual camera associated with the child block to another three-dimensional workspace and to the virtual camera associated with the parent block of said child block is accompanied by a change of URL from the URL associated with said child block to the URL associated with the parent block.

5. The computer-implemented human-machine interaction method according to claim 1 wherein a block at a hierarchical level of the hierarchical system model stored in the database which is connected with a parent-child relation to another block at a lower hierarchical level of said hierarchical system model forms a parent block with respect to the other block at the lower hierarchical system level which in turn forms a child block of said parent block at the higher hierarchical level.

6. The computer-implemented human-machine interaction method according to claim 1 wherein each block is containing a number of content areas of different content area types, where said content areas are arranged in rows and columns and said content areas are revealable or hideable according to the reveal/hide criterion, wherein the content area types of a block of said hierarchical system model stored in the database comprise
- a first content area type forming a children area adapted to indicate deeper nested child blocks of the respective block;
- a second content area type forming a data area containing content data, in particular text content data and image content data;
- a third content area type forming a dynamic area containing dynamic data provided by third party services via API; and
- a fourth content area type forming a user control input-area providing a user's input sensitive content area adapted to generate automatically a control signal if the user input sensitive area is selected in response to a user selection command.

7. The computer-implemented human-machine interaction method according to claim 1 wherein each block of the hierarchical system model stored in the database comprises a unique block identifier and the uniform resource allocator, URL, reflecting the hierarchical structure of the hierarchical system model stored in the database
- wherein each block comprises a user-defined rights-management with which the user can give other users read or write access to the workspace associated with a block via an URL, associated with the respective block
- wherein the user-defined rights-management setting is passed down to direct child-blocks and deeper nested child-blocks of a block as long as no other user-defined rights-management setting is applied to a child-block or deeper child-block of said block.

8. The computer-implemented human-machine interaction method according to claim 1 wherein the virtual camera associated with the parent block of the hierarchical system model stored in the database is moved in response to a zoom user command input into an input unit (2) of the HMI user interface in the three-dimensional workspace towards the child-block of said parent block to reduce the distance between the virtual camera of the parent block and the child-block within the three-dimensional workspace of the parent block and to zoom in on the respective child-block and its content areas
- wherein the virtual camera associated with the parent block of the hierarchical system model stored in the database is moved automatically in response to a user command input into the input unit of the HMI user interface in the three-dimensional workspace parallel to the child-blocks, of said parent block and
- wherein the virtual camera associated with the parent block of the hierarchical system model stored in the database is rotated in response to a rotation user command input into the input unit of the HMI user interface in the three-dimensional workspace of the parent block around the current camera position.

9. The computer-implemented human-machine interaction method according to claim 1 wherein blocks within the hierarchical system model stored in the database are linkable to each other via relations which comprise associated relation labels to describe the respective relation.

10. The computer-implemented human-machine interaction method according to claim 1 wherein a switchover criterion is based on a configurable distance threshold in the three-dimensional workspace wherein if a calculated distance between the virtual camera movable within the three-dimensional workspace associated with the parent block and a child-block of said parent block B1, becomes smaller than the configurable distance threshold, TH, a switchover to the virtual camera associated with the child block of said parent block is performed automatically.

11. The computer-implemented human-machine interaction method according to claim 1 wherein new child-blocks of the parent block are creatable by the user within the three-dimensional workspace associated with the parent block if the user has a write access to the respective parent block
- wherein the style of a child-block of the parent block comprising among others background-color, border-color and border-radius, is editable by the user within the three-dimensional workspace associated with a parent block if the user has a write access to the respective parent block
- wherein the size of a child-block of the parent block is changeable by the user within the three-dimensional workspace associated with the parent block if the user has write access to the respective parent block
- wherein the position of a child-block of the parent block is changeable via drag or entering the position directly by the user within the three-dimensional workspace associated with the parent block if the user has write access to the respective parent block
- wherein the hierarchical position of a child-block of the parent block is changeable via drag and drop by the user within the three-dimensional workspace associated with the parent block if the user has write access to the parent block and the new parent-block, to which said child-block is moved to,
- wherein new content-areas for a child-block of the parent block are creatable by the user within the three-dimensional workspace associated with the parent block if the user has write access to the respective parent block
- wherein the content of content-areas with type for a child-block of the parent block are editable by the user in response to a user selection command to select the respective content-area within the three-dimensional workspace associated with the parent block if the user has write access to the respective parent block.

12. The computer-implemented human-machine interaction method according to claim 1 wherein calculations to display three-dimensional workspaces associated with selectable blocks are performed on a graphics processing unit which is optimized for calculations of three-dimensional scenes and provides a high performance.

13. The computer-implemented human-machine interaction method according to claim 1 wherein if a content-area of type input-area of a block is selected in response to a user selection command input via the input unit of the HMI user interface, the generation of a control signal is triggered, wherein the generated control signal is supplied to a controller or to an actuator forming system components of the complex technical system represented by corresponding blocks in the hierarchical system model stored in the database.

14. A human-machine interaction, HMI, user interface connected to at least one controller or actuator of a complex system having a plurality of system components represented by associated blocks of a hierarchical system model stored in a database said HMI user interface comprising:
    an input unit adapted to receive user input commands of a user and
    a display unit having a screen adapted to display a scene within a three-dimensional workspace associated with a selectable parent block representing a corresponding system component of said complex system by means of a virtual camera associated to the respective parent block and positioned in a three-dimensional coordinate system within a loaded three-dimensional workspace of said parent block wherein the virtual camera of the parent block is moveable automatically in the three-dimensional workspace of the associated parent block in response to a user input command input into the input unit of said HMI user interface to perform a zooming operation on the respective parent block to reveal or hide its content areas
    wherein the content areas of the zoomed parent block include nested child blocks of the respective parent block and comprising:
    a processing unit comprising a graphical processing unit adapted to perform a computer-implemented human-machine interaction method used to assist a user to retrieve and create information about a complex system represented by the hierarchical system model stored in a database and displayed as a corresponding nested three-dimensional workspace structure on a screen of the display unit of the human machine interaction, HMI, user interface, said screen having a limited screen size and a limited screen resolution, wherein said hierarchical system model is processed to plan, monitor and control said complex system,
    wherein the processing unit is adapted to perform a computer-implemented human-machine interaction method by executing the following steps iteratively to provide a seamless semantic zoom between infinite nested three-dimensional workspaces representing the hierarchical system model;
    loading in a first step a three-dimensional workspace associated with a selected parent block using an associated, unique URL, representing a system component, of said complex system, wherein the loaded three-dimensional workspace of said parent block-contains a scene of deeper nested child blocks of said parent block-defined as subordinates of said parent block-in the hierarchical system model stored in the database and positioned in the loaded three-dimensional workspace of said parent block;
    displaying in a second step the three-dimensional workspace by projecting the scene of deeper nested child blocks of said parent block onto the screen of the display unit by means of a virtual camera associated to said parent block which is positioned in a three-dimensional coordinate system within the loaded three-dimensional workspace of said parent block;
    revealing or hiding in a third step content areas of visible displayed child blocks of said parent block depending on a reveal/hide criterion,
    wherein the reveal/hide criterion is calculated by a microprocessor of a processing unit of the HMI user interface in real time based on among others the size of the respective child block, the screen size of the screen of the display unit and based on the distance between the virtual camera associated to said parent block and the respective child block of said parent block wherein the distance is calculated as an Euclidean distance between the position of the virtual camera, and the position of a center point of the block; and
    displaying in a fourth step deeper nested child blocks corresponding to lower hierarchical levels of the hierarchical system model stored in the database if a content area of a children-area type of a child block is revealed based on the reveal/hide criterion, by projecting the scene of deeper nested child blocks of the respective child blocks, of the parent block onto the screen of the display unit via an intermediate, virtual projection of the scene of deeper nested child blocks of child block, onto said child block;
    repeating the third step and the fourth step until all deeper nested child blocks and associated content areas are displayed according to the reveal/hide criterion used in the third step and in the fourth step,
    wherein in a zooming operation to zoom in or to zoom out across an infinite number of hierarchical levels of the hierarchical system model the virtual camera of the selected parent block is moved in a z-direction of the coordinate system of the three-dimensional workspace of the selected parent block perpendicular towards projection of the scene of deeper nested child blocks of said parent block;
    wherein in a zooming-in operation if a predefined switchover criterion is fulfilled a switching from a current three-dimensional workspace and the virtual camera with the parent block to another three-dimensional workspace and to the virtual camera associated with a child block of said parent block is performed automatically and seamlessly,
    wherein in a zooming-out operation if a predefined switchover criterion is fulfilled a switching from a current three-dimensional workspace and the virtual camera associated with a child block to another three-dimensional workspace and to the virtual camera associated with the parent block of said child block is performed automatically and seamlessly.

15. The human-machine interaction user interface according to claim 14 wherein the selected parent block comprises a content area of a user input sensitive content area type which is adapted to generate automatically at least one control signal in response to a user activation command input into the input unit to trigger the generation of the control signal supplied to a system component of said complex technical system represented by the selected block or to a system component of said complex technical system represented by another block having a relation to the selected block in the hierarchical system model stored in the database.

16. The human-machine interaction user interface according to claim 14, wherein the display unit comprises a computer mouse, a smartphone- or tablet-screen, a Virtual Reality display device or an Augmented Reality device.

* * * * *